(12) United States Patent
Kirst

(10) Patent No.: US 12,442,675 B2
(45) Date of Patent: Oct. 14, 2025

(54) VIBRONIC MEASURING SYSTEM

(71) Applicant: Endress+Hauser Flowtec AG, Reinach (CH)

(72) Inventor: Michael Kirst, Lörrach (DE)

(73) Assignee: Endress+Hauser Flowtec AG, Reinach (CH)

( * ) Notice: Subject to any disclaimer, the term of this patent is extended or adjusted under 35 U.S.C. 154(b) by 279 days.

(21) Appl. No.: 18/044,019

(22) PCT Filed: Aug. 16, 2021

(86) PCT No.: PCT/EP2021/072663
§ 371 (c)(1),
(2) Date: Mar. 3, 2023

(87) PCT Pub. No.: WO2022/048888
PCT Pub. Date: Mar. 10, 2022

(65) Prior Publication Data
US 2023/0358587 A1    Nov. 9, 2023

(30) Foreign Application Priority Data

Sep. 3, 2020   (DE) .................... 10 2020 123 067.2
Nov. 30, 2020  (DE) .................... 10 2020 131 649.6

(51) Int. Cl.
*G01F 1/84*     (2006.01)
(52) U.S. Cl.
CPC .......... *G01F 1/8431* (2013.01); *G01F 1/8413* (2013.01); *G01F 1/849* (2013.01)
(58) Field of Classification Search
CPC ....... G01F 1/8431; G01F 1/8413; G01F 1/849
USPC ..................................................... 73/861.356
See application file for complete search history.

(56) References Cited

U.S. PATENT DOCUMENTS

| | | | |
|---|---|---|---|
| 4,680,974 | A | 7/1987 | Simonsen et al. |
| 4,738,144 | A | 4/1988 | Cage |
| 4,768,384 | A | 9/1988 | Flecken et al. |
| 4,777,833 | A | 10/1988 | Carpenter |

(Continued)

FOREIGN PATENT DOCUMENTS

| AU | 717965 B2 | 4/2000 |
|---|---|---|
| DE | 102019124709 A1 | 3/2021 |

(Continued)

*Primary Examiner* — Peter J Macchiarolo
*Assistant Examiner* — Rodney T Frank
(74) *Attorney, Agent, or Firm* — Christopher R. Powers; Endress+Hauser (USA) Holding, Inc.

(57) ABSTRACT

A measuring system includes a vibration-type transducer and electrically coupled measuring system electronics unit for controlling the transducer and evaluating vibration measurement signals provided by the transducer. The exciter arrangement has a vibration exciter which is positioned and aligned such that a drive offset is no more than 0.5% of the tube length. The measuring system electronics are configured to supply electrical power to the vibration exciter by means of an electrical drive signal having a temporally variable electrical current and to provide the drive signal at least intermittently with a sinusoidal second useful current having a second AC frequency, in order to monitor a quality of the measured substance based upon a corresponding second useful signal component of at least one of the vibration measurement signals.

55 Claims, 7 Drawing Sheets

(56) References Cited

U.S. PATENT DOCUMENTS

| | | |
|---|---|---|
| 4,793,191 A | 12/1988 | Flecken |
| 4,801,897 A | 1/1989 | Flecken |
| 4,823,614 A | 4/1989 | Dahlin, Erik B. |
| 4,831,885 A | 5/1989 | Dahlin |
| 4,879,911 A | 11/1989 | Zolock |
| 5,009,109 A | 4/1991 | Kalotay et al. |
| 5,024,104 A | 6/1991 | Dames |
| 5,050,439 A | 9/1991 | Thompson |
| 5,291,792 A | 3/1994 | Hussain |
| 5,359,881 A | 11/1994 | Kalotay et al. |
| 5,476,013 A | 12/1995 | Hussain et al. |
| 5,531,126 A | 7/1996 | Drahm |
| 5,602,345 A | 2/1997 | Wenger et al. |
| 5,691,485 A | 11/1997 | Endo et al. |
| 5,728,952 A | 3/1998 | Yao et al. |
| 5,734,112 A | 3/1998 | Bose et al. |
| 5,796,010 A | 8/1998 | Kishiro et al. |
| 5,796,011 A | 8/1998 | Keita et al. |
| 5,796,012 A | 8/1998 | Gomi et al. |
| 5,804,741 A | 9/1998 | Freeman |
| 5,831,178 A | 11/1998 | Yoshimura et al. |
| 5,861,561 A | 1/1999 | Van Cleve et al. |
| 5,869,770 A | 2/1999 | Yoshimura et al. |
| 5,926,096 A | 7/1999 | Mattar et al. |
| 5,945,609 A | 8/1999 | Kashimura et al. |
| 5,979,246 A | 11/1999 | Van Cleve et al. |
| 6,047,457 A | 4/2000 | Bitto et al. |
| 6,073,495 A | 6/2000 | Stadler |
| 6,092,429 A | 7/2000 | Cunningham et al. |
| 6,223,605 B1 | 5/2001 | Koudal et al. |
| 6,311,136 B1 | 10/2001 | Henry et al. |
| 6,330,832 B1 | 12/2001 | Normen et al. |
| 6,397,685 B1 | 6/2002 | Cook et al. |
| 6,513,393 B1 | 2/2003 | Eckert et al. |
| 6,557,422 B1 | 5/2003 | Kolahi |
| 6,651,513 B2 | 11/2003 | Wenger et al. |
| 6,666,098 B2 | 12/2003 | Drahm et al. |
| 6,691,583 B2 | 2/2004 | Rieder et al. |
| 6,763,730 B1 | 7/2004 | Wray |
| 6,840,109 B2 | 1/2005 | Drahm et al. |
| 6,868,740 B2 | 3/2005 | Hussain |
| 6,883,387 B2 | 4/2005 | Bitto et al. |
| 7,017,424 B2 | 3/2006 | Rieder et al. |
| 7,040,179 B2 | 5/2006 | Drahm et al. |
| 7,073,396 B2 | 7/2006 | Hussain et al. |
| 7,077,014 B2 | 7/2006 | Rieder et al. |
| 7,080,564 B2 | 7/2006 | Rieder et al. |
| 7,134,348 B2 | 11/2006 | Kolahi |
| 7,299,699 B2 | 11/2007 | Lorenz |
| 7,305,892 B2 | 12/2007 | Kourosh |
| 7,360,451 B2 | 4/2008 | Bitto et al. |
| 7,392,709 B2 | 7/2008 | Eckert |
| 7,406,878 B2 | 8/2008 | Rieder et al. |
| 7,562,586 B2 | 7/2009 | Rieder et al. |
| 9,052,225 B2 | 6/2015 | Anklin-Imhof et al. |
| 9,372,107 B2 | 6/2016 | Kirst |
| 2003/0015480 A1 | 1/2003 | Breen et al. |
| 2005/0125167 A1 | 6/2005 | Lesjak et al. |
| 2006/0000293 A1 | 1/2006 | Rieder et al. |
| 2006/0112774 A1 | 6/2006 | Kolahi et al. |
| 2006/0266129 A1 | 11/2006 | Eckert |
| 2007/0062308 A1 | 3/2007 | Deppe |
| 2007/0113678 A1 | 5/2007 | Baker et al. |
| 2007/0119264 A1 | 5/2007 | Bitto et al. |
| 2007/0119265 A1 | 5/2007 | Bitto et al. |
| 2007/0151370 A1 | 7/2007 | Bitto et al. |
| 2007/0151371 A1 | 7/2007 | Bitto et al. |
| 2007/0186685 A1 | 8/2007 | Bitto et al. |
| 2007/0186686 A1 | 8/2007 | Drahm et al. |
| 2008/0034893 A1 | 2/2008 | Stappert et al. |
| 2008/0041168 A1 | 2/2008 | Kolahi |
| 2008/0141789 A1 | 6/2008 | Kassubek et al. |
| 2010/0011882 A1 | 1/2010 | Gebhardt et al. |
| 2010/0050783 A1 | 3/2010 | Hussain et al. |
| 2010/0095783 A1 | 4/2010 | Kuttler et al. |
| 2010/0095784 A1 | 4/2010 | Kuttler et al. |
| 2010/0095785 A1 | 4/2010 | Kuttler et al. |
| 2010/0101333 A1 | 4/2010 | Hussain |
| 2010/0139416 A1 | 6/2010 | Kolahi |
| 2010/0139417 A1 | 6/2010 | Kolahi |
| 2010/0236338 A1 | 9/2010 | Bitto et al. |
| 2010/0242623 A1 | 9/2010 | Bitto et al. |
| 2010/0242624 A1 | 9/2010 | Bitto et al. |
| 2010/0251830 A1 | 10/2010 | Bitto et al. |
| 2011/0167907 A1 | 7/2011 | Bitto et al. |
| 2012/0123705 A1 | 5/2012 | Drahm et al. |
| 2014/0352454 A1 | 12/2014 | Huber et al. |
| 2016/0033314 A1 | 2/2016 | Huber et al. |
| 2016/0116319 A1 | 4/2016 | Rensing et al. |
| 2016/0123836 A1 | 5/2016 | Zhu et al. |
| 2016/0138997 A1 | 5/2016 | Zhu et al. |
| 2016/0349091 A1 | 12/2016 | Huber et al. |
| 2017/0030870 A1 | 2/2017 | Dual |
| 2017/0356777 A1 | 12/2017 | Zhu et al. |
| 2018/0231411 A1 | 8/2018 | Zhu et al. |
| 2019/0154485 A1 | 5/2019 | Zhu et al. |
| 2020/0132529 A1 | 4/2020 | Rensing et al. |
| 2023/0341247 A1* | 10/2023 | Kirst ............... G01F 1/8431 |

FOREIGN PATENT DOCUMENTS

| | | |
|---|---|---|
| EP | 317340 A2 | 5/1989 |
| EP | 816807 A2 | 1/1998 |
| EP | 2638367 A1 | 9/2013 |
| JP | 7083718 A | 3/1995 |
| JP | 7134053 A | 5/1995 |
| JP | H08136311 A | 5/1996 |
| WO | 8706691 A1 | 11/1987 |
| WO | 9301472 A1 | 1/1993 |
| WO | 9516897 A2 | 6/1995 |
| WO | 9529386 A1 | 11/1995 |
| WO | 9605484 A1 | 2/1996 |
| WO | 9608697 A2 | 3/1996 |
| WO | 9726508 A1 | 7/1997 |
| WO | 9928708 A1 | 6/1999 |
| WO | 9939164 A1 | 8/1999 |
| WO | 9940394 A1 | 8/1999 |
| WO | 9944018 A1 | 9/1999 |
| WO | 0014485 A1 | 3/2000 |
| WO | 0102816 A2 | 1/2001 |
| WO | 03021204 A1 | 3/2003 |
| WO | 03021205 A1 | 3/2003 |
| WO | 2004072588 A2 | 8/2004 |
| WO | 2005040734 A1 | 5/2005 |
| WO | 2005050145 A1 | 6/2005 |
| WO | 2006036139 A1 | 4/2006 |
| WO | 2007097760 A1 | 8/2007 |
| WO | 2008013545 A1 | 1/2008 |
| WO | 2008077574 A2 | 7/2008 |
| WO | 2009089839 A1 | 7/2009 |
| WO | 2009134827 A1 | 11/2009 |
| WO | 2009134829 A1 | 11/2009 |
| WO | 2009134830 A1 | 11/2009 |
| WO | 2009136943 A1 | 11/2009 |
| WO | 2011019345 A1 | 2/2011 |
| WO | 2013002759 A1 | 1/2013 |
| WO | 2013009307 A1 | 1/2013 |
| WO | 2017019016 A1 | 2/2017 |
| WO | 2017069749 A1 | 4/2017 |
| WO | 2017108283 A1 | 6/2017 |
| WO | 2017194278 A1 | 11/2017 |
| WO | 2019017891 A1 | 1/2019 |
| WO | 2019081169 A1 | 5/2019 |
| WO | 2019081170 A1 | 5/2019 |
| WO | 2020126287 A1 | 6/2020 |
| WO | 2020221534 A1 | 11/2020 |
| WO | 2021037492 A1 | 3/2021 |

* cited by examiner

VIBRONIC MEASURING SYSTEM

CROSS-REFERENCE TO RELATED APPLICATIONS

The present application is related to and claims the priority benefit of German Patent Application No. 10 2020 123 067.2, filed Sep. 3, 2020, German Patent Application No. 10 2020 131 649.6, filed Nov. 30, 2020, and International Patent Application No. PCT/EP2021/072663, filed Aug. 16, 2021, the entire contents of which are incorporated herein by reference.

TECHNICAL FIELD

The invention relates to a vibronic measuring system, formed by means of a vibration-type transducer and a measuring system electronics unit electrically connected thereto, especially, a Coriolis mass flow measuring device or Coriolis mass flow/density measuring device, for measuring and/or monitoring at least one measured variable of a flowing measured substance, especially, i.e., a gas, a liquid, or a dispersion.

BACKGROUND

The measured variable may, for example, be a temporally variable flow parameter, e.g., a mass flow, a volumetric flow or a flow rate, and/or a temporally variable substance parameter, e.g., a density and/or a viscosity, of the respective measured substance. Such measuring systems, typically designed as an in-line measuring device of compact design, have been known for a long time and have proven themselves in industrial use, not least also in the field of the regulation and monitoring of automated process-engineering processes or process systems or in the field of transfer points of the goods traffic, which may also be subject to calibration. Examples of vibronic measuring systems of the type in question and their use are, for example, described in EP-A 317 340, EP-A 816 807, JP-A 8-136311, JP-A 9-015015, US-A 2003/0154804, US-A 2005/0125167, US-A 2006/0000293, US-A 2006/0112774, US-A 2006/0266129, US-A 2007/0062308, US-A 2007/0113678, US-A 2007/0119264, US-A 2007/0119265, US-A 2007/0151370, US-A 2007/0151371, US-A 2007/0186685, US-A 2008/0034893, US-A 2008/0041168, US-A 2008/0141789, US-A 2010/0011882, US-A 2010/0050783, US-A 2010/0101333, US-A 2010/0139416, US-A 2010/0139417, US-A 2010/0236338, US-A 2010/0242623, US-A 2010/0242624, US-A 2010/0251830, US-A 2011/0167907, US-A 2012/0123705, US-A 2014/0352454, US-A 2016/0033314, US-A 2016/0123836, US-A 2016/0138997, US-A 2016/0349091, US-A 2017/0030870, US-A 2017/0356777, US-A 2020/0132529, U.S. Pat. Nos. 4,680,974, 4,738,144, 4,768,384, 4,777,833, 4,793,191, 4,801,897, 4,823,614, 4,831,885, 4,879,911, 5,009,109, 5,024,104, 5,050,439, 5,291,792, 5,359,881, 5,398,554, 5,476,013, 5,531,126, 5,602,345, 5,691,485, 5,728,952, 5,734,112, 5,796,010, 5,796,011, 5,796,012, 5,804,741, 5,831,178, 5,861,561, 5,869,770, 5,926,096, 5,945,609, 5,979,246, 6,047,457, 6,073,495, 6,092,429, 6,223,605, 6,311,136, 6,330,832, 6,397,685, 6,513,393, 6,557,422, 6,651,513, 6,666,098, 6,691,583, 6,840,109, 6,868,740, 6,883,387, 7,017,424, 7,040,179, 7,073,396, 7,077,014, 7,080,564, 7,134,348, 7,299,699, 7,305,892, 7,360,451, 7,392,709, 7,406,878, 7,562,586, WO-A 00/14485, WO-A 01/02816, WO-A 03/021204, WO-A 03/021205, WO-A 2004/072588, WO-A 2005/040734, WO-A 2005/050145, WO-A 2006/036139, WO-A 2007/097760, WO-A 2008/013545, WO-A 2008/077574, WO2009/134827, WO-A 2009/134829, WO-A 2009/134830, WO-A 2009/136943, WO-A 2011/019345, WO-A 2013/002759, WO-A 2013/009307, WO-A 2017/019016, WO-A 2017/069749, WO-A 2017/108283, WO-A 2017/194278, WO-A 2019/017891, WO-A 2019/081169, WO-A 2019/081170, WO-A 2020/126287, WO-A 87/06691, WO-A 93/01472, WO-A 95/16897, WO-A 95/29386, WO-A 96/05484, WO-A 96/08697, WO-A 97/26508, WO-A 99/39164, WO-A 99/40394, WO-A 99/44018, or our own non-prepublished patent applications DE102019124709.8, PCT/EP2020/059050 and PCT/EP2020/071817 and have also, inter alia, been produced by the applicant for a long time and advertised as a Coriolis mass flow measuring device or as a Coriolis mass flow/density measuring device, e.g., under the trade name, "PROMASS G 100," "PROMASS O 100," "PROMASS E 200," "PROMASS F 300," "PROMASS X 500," "CNGmass," "LPGmass," or "Dosimass" (https://www.endress.com/de/search?filter.text=promass).

The invention relates to a vibronic measuring system, formed by means of a vibration-type transducer and a measuring system electronics unit electrically connected thereto, especially, a Coriolis mass flow measuring device or Coriolis mass flow/density measuring device, for measuring and/or monitoring at least one measured variable of a flowing measured substance, especially, i.e., a gas, a liquid, or a dispersion. The measured variable may, for example, be a temporally-variable flow parameter, e.g., a mass flow, a volumetric flow or a flow rate, and/or a temporally-variable substance parameter, e.g., a density and/or a viscosity, of the respective measured substance. Such measuring systems, typically designed as an in-line measuring device of compact design, have been known for a long time and have proven themselves in industrial use, not least also in the field of the regulation and monitoring of automated process-engineering processes or process systems or in the field of transfer points of the goods traffic, which may also be subject to calibration. Examples of vibronic measuring systems of the type in question and their use are, for example, described in EP-A 317 340, EP-A 816 807, JP-A 8-136311, JP-A 9-015015, US-A 2003/0154804, US-A 2005/0125167, US-A 2006/0000293, US-A 2006/0112774, US-A 2006/0266129, US-A 2007/0062308, US-A 2007/0113678, US-A 2007/0119264, US-A 2007/0119265, US-A 2007/0151370, US-A 2007/0151371, US-A 2007/0186685, US-A 2008/0034893, US-A 2008/0041168, US-A 2008/0141789, US-A 2010/0011882, US-A 2010/0050783, US-A 2010/0101333, US-A 2010/0139416, US-A 2010/0139417, US-A 2010/0236338, US-A 2010/0242623, US-A 2010/0242624, US-A 2010/0251830, US-A 2011/0167907, US-A 2012/0123705, US-A 2014/0352454, US-A 2016/0033314, US-A 2016/0123836, US-A 2016/0138997, US-A 2016/0349091, US-A 2017/0030870, US-A 2017/0356777, US-A 2020/0132529, U.S. Pat. Nos. 4,680,974, 4,738,144, 4,768,384, 4,777,833, 4,793,191, 4,801,897, 4,823,614, 4,831,885, 4,879,911, 5,009,109, 5,024,104, 5,050,439, 5,291,792, 5,359,881, 5,398,554, 5,476,013, 5,531,126, 5,602,345, 5,691,485, 5,728,952, 5,734,112, 5,796,010, 5,796,011, 5,796,012, 5,804,741, 5,831,178, 5,861,561, 5,869,770, 5,926,096, 5,945,609, 5,979,246, 6,047,457, 6,073,495, 6,092,429, 6,223,605, 6,311,136, 6,330,832, 6,397,685, 6,513,393, 6,557,422, 6,651,513, 6,666,098, 6,691,583, 6,840,109, 6,868,740, 6,883,387, 7,017,424, 7,040,179, 7,073,396, 7,077,014, 7,080,564, 7,134,348, 7,299,699, 7,305,892, 7,360,451, 7,392,709, 7,406,878, 7,562,586, WO-A 00/14485, WO-A 01/02816, WO-A 03/021204, WO-A 03/021205, WO-A 2004/072588, WO-A 2005/040734, WO-A 2005/050145, WO-A 2006/036139, WO-A 2007/097760, WO-A 2008/013545, WO-A 2008/077574, WO2009/134827, WO-A 2009/134829, WO-A 2009/134830, WO-A 2009/136943, WO-A 2011/019345, WO-A 2013/002759, WO-A 2013/009307, WO-A 2017/019016, WO-A 2017/069749, WO-A 2017/108283, WO-A 2017/194278, WO-A 2019/017891, WO-A 2019/081169, WO-A 2019/081170, WO-A 2020/126287, WO-A 87/06691, WO-A 93/01472, WO-A 95/16897, WO-A 95/29386, WO-A 96/05484, WO-A 96/08697, WO-A 97/26508, WO-A 99/39164, WO-A 99/40394, WO-A 99/44018, or our own non-prepublished patent applications DE102019124709.8, PCT/EP2020/059050 and PCT/EP2020/071817 and have also, inter alia, been produced by the applicant for a long time and advertised as a Coriolis mass flow measuring device or as a Coriolis mass flow/density measuring device, e.g., under the trade name, "PROMASS G 100," "PROMASS O 100," "PROMASS E 200," "PROMASS F 300," "PROMASS X 500," "CNGmass," "LPGmass," or "Dosimass" (https://www.endress.com/de/search?filter.text=promass).

Each of the transducers of the measuring systems shown therein comprises at least one tube assembly for conducting the flowing measured substance, an exciter assembly for converting electrical power into mechanical power used to excite and maintain forced mechanical vibrations of the tube assembly, and a sensor assembly for detecting mechanical vibrations of the tube assembly and for providing vibration measurement signals respectively representing vibration movements of the tube assembly. Both the exciter assembly and the sensor assembly are respectively electrically coupled to the measuring system electronics unit, which in turn is used to control the transducer, especially, i.e., the exciter assembly thereof, and to receive and evaluate measurement signals supplied therefrom, especially, i.e., vibration measurement signals supplied from the sensor assembly thereof, especially, i.e., to determine measured values representing the at least one measured variable. In order to protect against external influences, the tube assembly together with the exciter assembly and sensor assembly is accommodated in a typically metallic transducer protective housing, and the measuring system electronics unit is accommodated in a, for example, likewise metallic, electronics protective housing; the latter may also be held directly on the aforementioned transducer protective housing, forming, for example, a Coriolis mass flow/density measuring device of compact design. In the case of measuring systems shown in WO-A 96/08697 or WO-A 2019/017891, the transducer protective housing and the tube assembly are in particular detachably connected to one another again, e.g., in order to enable subsequent insertion of the tube assembly or replacement of a defective or worn tube assembly with an intact tube assembly on-site.

The aforementioned tube assemblies are each provided to be integrated into the course of a process line and each have at least one tube, for example, i.e., exactly one tube or exactly two tubes or exactly four tubes, which in each case extends with a tube length from a respective first tube end to a respective second tube end and has a lumen which is enclosed by a, typically metallic, tube wall, and extends from the first tube end to the second tube end. Due to the measuring principle, the at least sectionally curved and/or at least sectionally straight tube is configured to be traversed, at least in a flow direction from the first tube end to the second tube end, by the measured material which is fed or discharged again via the connected process line, and to be allowed to vibrate in the meantime, e.g., for the purpose of generating the mass flow-dependent Coriolis forces, inertial forces dependent upon the density of the measured substance, and/or frictional forces dependent upon the viscosity of the measured substance, for example, i.e., in order to carry out flexural vibrations about a static resting position. The tubes of marketed (standard) measuring systems typically have at least two planes of symmetry orthogonal to one another and may, for example, have a U- or V- or a rectangular or triangular shape, and even more rarely also a Ω or helical shape. Moreover, the respective tube wall thereof typically consists of a steel, for example, i.e., a stainless steel, duplex steel, or super duplex steel, of a titanium alloy, a zirconium alloy, e.g., a Zircaloy, and/or a tantalum alloy. The tube length of such tubes can be in a range between approximately 100 mm and 2,000 mm, and a caliber (inner tube diameter) of such tubes can be in the range between approximately 0.1 mm and approximately 100 mm, typically such that the respective tube has a caliber-to-tube length ratio in the range between approximately 0.08 and 0.25.

In the case of transducers with a single tube, the latter usually communicates with the aforementioned process line via a substantially straight connecting tube piece opening into the inlet side and via a substantially straight connecting tube piece opening into the outlet side. Furthermore, the tube assembly of such transducers with a single tube respectively comprises at least one single-piece or multi-part, e.g., tubular, box-shaped, or plate-shaped counter-oscillator, which is coupled to the tube on the inlet side to form a first coupling zone and which is coupled to the tube on the outlet side to form a second coupling zone, and which substantially rests in operation or oscillates in opposition to the tube, i.e., at the same frequency and in phase opposition. The tube assembly of such a transducer formed by means of tube and counter-oscillator is usually held vibratably in the aforementioned transducer protective housing by means of the two connecting tube pieces via which the tube communicates with the process line during operation. In the case of the (standard) transducers shown, for example, in U.S. Pat. Nos. 5,291,792, 5,796,010, 5,945,609, 7,077,014, US-A 2007/0119264, WO-A 01/02816, or also WO-A 99/40394, with a single, substantially straight tube, the latter and the counter-oscillator are aligned substantially coaxially with one another, as is quite usual in conventional transducers. Comparatively cost-effective steel grades, such as construction steel or machining steel, are usually used as materials for the counter-oscillators, not least also when titanium, tantalum, or zirconium are used for the tube. In the case of transducers with two or more tubes, the respective tube assembly typically respectively has an inlet-side flow divider, which extends between the tubes and an inlet-side connecting flange, and has an outlet-side flow divider which extends between the tubes and an outlet-side connecting flange and via which the tube assembly can be integrated into the process line. The tube assemblies shown in US-A 2012/0123705, U.S. Pat. Nos. 5,602,345, 5,926,096, WO-A 2009/136943, WO-A 87/06691, WO-A 96/05484, WO-A 96/08697, WO-A 97/26508, WO-A 99/39164, or WO-A 2019/017891 respectively have two tubes, i.e., a first tube and a second tube structurally identical and parallel thereto, as well as a first, or inlet-side, flow divider, used here as a line-branching unit, with exactly two flow openings and a second, or outlet-side, flow divider structurally identical to the first flow divider and used here as a line-merging unit, with exactly two flow openings, while tube assemblies shown in U.S. Pat. No. 5,602,345, or WO-A 96/08697, or US-A 2017/0356777 or WO-A 2019/081169 or WO-A 2019/081170 or the mentioned patent application PCT/EP2019/082044, respectively have a first, or inlet-side, flow divider, used here as a line-branching unit, with exactly two flow openings, a second, or outlet-side, flow divider structurally identical to the first flow divider and used here as a line-merging unit, with exactly two flow openings, as well as two tubes, i.e., a first tube as well as a second tube. Moreover, each of the two or four tubes is respectively connected to each of the first and second flow dividers in such a way that the first tube opens with its first end into a first flow opening of the first flow divider and with its second end into a first flow opening of the second flow divider, the second tube opens with its first end into a second flow opening of the first flow divider and with its second end into a second flow opening of the second flow divider or that the first tube opens with its first end into a first flow opening of the first flow divider and with its second end into a first flow opening of the second flow divider, the second tube opens with its first end into a second flow opening of the first flow divider and with its second end into a second flow opening of the second flow divider, the third tube opens with its first end into a third flow opening of the first flow divider and with its second end into a third flow opening of the second flow divider, and the fourth tube opens with its first end into a fourth flow opening of the first flow divider and with its second end into a fourth flow opening of the second flow divider. Moreover, the flow dividers of marketed transducers are typically designed as an integral component of the aforementioned transducer protective housing.

In order to generate vibration signals that are influenced by the measured variable to be measured or correspond thereto accordingly, the at least one tube of the transducer is actively excited during operation of the measuring system by means of the exciter assembly to vibrate in a vibration form suitable for the measurement of the respective measured variable or for the generation of the aforementioned Coriolis, inertial, or frictional forces and occasionally also referred to as driving mode or useful mode, and the corresponding vibration responses, i.e., the resulting vibration movements of the at least one tube, are detected simultaneously by means of the sensor assembly.

For (actively) exciting mechanical vibrations of the at least one tube, the exciter assemblies have at least one electromechanical, typically i.e., electrodynamic, vibration exciter, which is mechanically connected partially to the tube and is configured to convert electrical power with a temporally-variable electrical current into mechanical power in such a way that a temporally-variable drive force acts on the tube at a drive point formed by means of the vibration exciter on the tube mechanically connected thereto. In the aforementioned case, in which the tube assembly has at least one further (second) tube, the at least one vibration exciter can moreover be partially also fastened thereto in such a way that the vibration exciter differentially acts on the two tubes. For the other aforementioned case in which the tube assembly has a counter-oscillator, the vibration exciter can be partially fastened thereto in such a way that the vibration exciter differentially acts on tube and counter-oscillator. However, the vibration exciter may, for example, also be partially attached to the aforementioned transducer protective housing. In the case of transducers of conventional (standard) measuring systems, the at least one vibration exciter is typically moreover designed and arranged such that the drive force generated thereby acts practically only at points on the respective tube or that a line of action of the drive force generated thereby is substantially perpendicular to a normal of a drive cross-sectional area, i.e., a cross-sectional area of the tube, which is enclosed by an imaginary circumferential line passing through the aforementioned drive point. In the case of (standard) transducers of marketed (standard) measuring systems, the exciter assemblies, such as, inter alia, also shown in U.S. Pat. Nos. 5,602,345, 5,796,010, 6,840,109, 7,077,014 or 7,017,424, US-A 2014/0352454, WO-A 93/01472, WO-A 2005/050145, WO-A 2013/002759, WO-A 2011/019345, are typically moreover designed such that each of the tubes is (partially) connected to exactly one vibration exciter in such a way that, apart from the (one) vibration exciter, the exciter assembly does not have any further vibration exciter connected to the respective tube. Not least for this (standard) case, the vibration exciter is typically of the electrodynamic type, i.e., formed by means of an vibration coil, e.g., in such a way that the magnetic armature thereof is mechanically connected to the at least one tube to form the drive point, and that the air coil thereof which is flooded by the magnetic field of the armature is electrically connected to the measuring system electronics unit and is mechanically connected to the other tube or the counter-oscillator of the tube assembly or to the transducer protective housing. Nevertheless, vibronic measuring systems are also known, for example, from WO-A 2017/069749, WO-A 2017/019016, WO-A 2006/036139, U.S. Pat. No. 5,926,096, WO-A 99/28708, WO-A 99/44018, WO-A 99/02945, US-A 2020/0132529, U.S. Pat. Nos. 4,831,885, 6,557,422, 6,092,429, or also U.S. Pat. No. 4,823,614, in which the exciter assembly has two or more vibration exciters respectively connected to one and the same one of the tubes of the respective tube assembly and/or formed by means of one or more piezo elements.

In order to detect vibrations of the at least one tube, the sensor assembly has at least two, e.g., electrodynamic or optical, vibration sensors, of which a first vibration sensor is positioned on the inlet side on the tube at a distance from the vibration exciter in the flow direction, and a second vibration sensor, typically structurally identical to the first vibration sensor, is positioned on the outlet side on the tube at a distance from the vibration exciter in the flow direction. Each of the at least two vibration sensors is moreover configured to detect vibration movements of the tube and convert them into a first or second vibration measurement signal, which is especially electrical or optical and represents said vibration movements—for example, with an electrical voltage dependent upon the vibrations of the tube. In the case of electrodynamic vibration sensors, they can respectively be formed, for example, by means of a plunger coil electrically connected to the measuring system electronics unit, for example, i.e., in such a way that the magnetic armature thereof is mechanically connected to the at least one tube and that the air coil thereof which is flooded by the magnetic field of the armature is electrically connected to the measuring system electronics unit and is mechanically connected to the other tube or the counter-oscillator of the tube assembly or to the transducer protective housing.

The measuring system electronics unit of each of the aforementioned measuring systems is moreover configured to energize during operation the at least one vibration exciter according to the useful mode to be excited, i.e., to feed electrical power into the at least one vibration exciter by means of at least one electrical drive signal having a temporally-variable electrical current controlled, e.g., with regard to (AC) frequency, phase angle, and amplitude, in such a way that the tube performs forced mechanical vibrations, i.e., for example, flexural vibrations, with one or more vibration frequencies that are specified by the drive signal and typically, i.e., correspond to one or more resonance frequencies of the at least one tube; this, for example, also with a constantly controlled vibration amplitude. For this purpose, the drive signal may be formed as a harmonic sinusoidal signal, i.e., a sinusoidal signal having exactly the one (AC) frequency, or, for example, also as a multi-frequency signal, i.e., a signal containing several signal components with different (AC) frequencies. As a result, each of the first and second vibration measurement signals provided by the sensor assembly respectively contains one or more sinusoidal signal components with respectively one frequency corresponding to a vibration frequency of vibration movements of the tube, specifically in such a way that each of the first and second vibration signals respectively has at least also one useful signal component, i.e., a sinusoidal signal component with a (signal) frequency corresponding to the first useful frequency. Accordingly, the measuring system electronics unit is also configured to at least intermittently provide the aforementioned drive signal for the vibration exciter with a sinusoidal (useful) current having an (AC) frequency, in such a way that the at least one tube at least partially or predominantly performs useful vibrations, i.e., mechanical vibrations forced by the (energized) vibration exciter, with a useful frequency, i.e., a (vibration) frequency corresponding to the aforementioned (AC) frequency.

In the case of measuring systems of the type in question, typically one or more of a plurality of natural vibration modes, inherent in the tube and respectively having an associated natural or resonance frequency, especially, i.e., one or more symmetric vibration modes in which the tube can perform or performs vibration movements respectively having an odd number of vibration antinodes and a correspondingly even number of vibration nodes, is used as the useful mode. Not least due to their particular suitability for measuring both the mass flow and the density and also the viscosity of the flowing measured substance, in such measuring systems, especially, also in the case of marketed standard measuring systems, one or more natural symmetric flexural vibration modes are preferably used as the useful mode. In the case of transducers with a curved tube or curved tubes, such a symmetric flexural vibration mode, in which the respective tube oscillates about an imaginary first vibration axis, which imaginarily connects the first and second tube ends, in the manner of a cantilever, which is only clamped at one end, about a static resting position (out-of-plane mode), is typically selected as the useful mode, while, in the case of transducers with a straight tube or straight tubes, such a symmetric flexural vibration mode, in which the respective tube oscillates about an imaginary vibration axis, which coincides with one of the main inertia axes thereof (longitudinal axis) and imaginarily connects the first and second tube ends, in the manner of a clamped string about a static resting position (in-plane mode), is usually selected as the useful mode. In marketed measuring systems, especially the use of the first-order (flexural) vibration mode, occasionally also referred to as the fundamental vibration mode or f1 mode, in which the vibration movements of the tube respectively have exactly one vibration antinode and two vibration nodes and are therefore symmetric, and more rarely also the use of the third-order (flexural) vibration mode, likewise symmetric and occasionally also referred to as f3 mode, in which the vibration movements of the tube respectively have exactly three vibration antinodes and four vibration nodes, has become established as the useful mode.

For the aforementioned (standard) case in which exactly a single vibration exciter is provided per tube (or per tube pair), the vibration exciter is accordingly always positioned and aligned such that the aforementioned drive cross-sectional area is located as far as possible in the region of half the tube length and therefore at a respective maximum vibration amplitude of each of the aforementioned symmetric vibration modes or a maximum amplitude of the corresponding useful vibrations, nevertheless at a vibration node of an asymmetric vibration mode likewise inherent in the tube. For the purpose of achieving a highest possible efficiency in the excitation of the useful mode, but also for the purpose of avoiding undesired excitation of vibrations in one or more of the aforementioned asymmetric vibration modes, the vibration exciter in the case of marketed (standard) measuring systems is moreover especially positioned such that a drive offset, i.e., a smallest distance between the drive cross-sectional area of the tube and a specified reference cross-sectional area, i.e., one located at a maximum amplitude of the vibration movements of the useful vibrations, of the at least one tube is as low as possible, i.e., ideally zero. In the case of marketed (standard) measuring systems, an intersection line of two, mutually-orthogonal symmetry planes of the at least one tube or a main inertia axis, perpendicular to the vibration direction of the vibration movements of the tube in the second-order vibration mode or to the drive force, of the at least one tube is typically also within the aforementioned reference cross-sectional area. In the case of marketed (standard) measuring systems, the drive offset, not least due to the various tolerances of the components and assemblies required in the production of the transducers or required therefor, is actually slightly different from zero, but is typically less than 5 mm and less than 0.5% of the tube length, and, usually, actually also less than 2 mm and less than 0.2% of the tube length.

For the purpose of efficient excitation of the useful mode, the measuring system electronics unit is especially also configured to accordingly adjust the (AC) frequency determining the useful frequency, such that it as precisely as possible corresponds to a resonance frequency (f1) of the first-order vibration mode or to a resonance frequency (f3) of the third-order vibration mode or deviates from the respective resonance frequency to be adjusted by less than 1% of said resonance frequency and/or by less than 1 Hz and therefore from the resonance frequency of any other of the natural vibration modes of the tube by more than 5% of said resonance frequency and/or more than 10 Hz, or the measuring system electronics unit is accordingly also configured to follow a change in the resonance frequency, e.g., as a result of a change in the density of the measured substance conducted in the tube, with a change in the (AC) frequency of the drive signal such that the excited useful vibrations are predominantly resonance vibrations of the at least one tube. In order to adjust the (AC) frequency, the measuring system electronics unit of the respective measuring system, e.g., as respectively shown in US-A 2016/0349091, US-A 2017/0030870, U.S. Pat. Nos. 5,831,178, and 4,801,897, may, for example, have a phase-locked loop (PLL), and optionally also a digital one.

As a result of the useful vibrations of the at least one tube excited in the aforementioned manner, Coriolis forces, which, inter alia, also depend upon the mass flow, are induced in the measured substance flowing through, in such a way that the useful vibrations are superposed by Coriolis vibrations, i.e., additionally forced vibrations with a useful frequency, which correspond to a natural vibration mode, sometimes also referred to as a Coriolis mode, with an order increased by one in comparison to the order of the useful mode, and that the useful signal components of the vibration measurement signals follow a change in a mass flow of the measured substance conducted in the tube with a change in a phase difference of the useful signal components, i.e., a difference between a phase angle of the useful signal component of the first vibration measurement signal and a phase angle of the useful signal component of the second vibration measurement signal. The measuring system electronics unit of each of the aforementioned measuring systems is moreover accordingly configured to generate, based upon the aforementioned phase difference, caused by the vibrations of the tube in the Coriolis mode, of the useful signal components, mass-flow measured values representing the mass flow. In the case of marketed (standard) measuring systems, the second-order antisymmetric vibration mode is typically used as the Coriolis mode when the fundamental vibration mode is used as the useful mode, or the fourth-order antisymmetric vibration mode is typically used as the Coriolis mode when the third-order vibration mode is used as the useful node. Since the resonance frequency of the vibration mode used as the useful mode especially depends upon the instantaneous density of the measured substance, in addition to the mass flow, the density of the measured substance respectively flowing through can additionally also be directly measured by means of commercially available Coriolis mass flow meters based upon the (AC) frequency of the drive signal and/or based upon the (signal) frequency of the useful signal components of the vibration measurement signals. Accordingly, the measuring system electronics unit of measuring systems of the type in question is typically also configured to generate density measured values representing the density, based upon the aforementioned (AC) frequency of the drive signal and/or based upon the signal frequency of the aforementioned useful signal component of at least one of the vibration signals. Furthermore, it is also possible, by means of vibronic measuring systems of the type in question, to directly measure the viscosity of the measured substance flowing through, e.g., based upon an excitation energy or excitation power required for maintaining the useful vibrations and/or based upon a damping, resulting from a dissipation of vibration energy, of the useful vibrations. In addition, further measured variables derived from the aforementioned flow and/or substance parameters, such as the Reynolds number, can be easily determined by means of such vibronic measuring systems.

As discussed inter alia in the above-mentioned US-A 2003/0154804, US-A 2007/0186686, US-A 2010/0095783, US-A 2010/0095784, US-A 2010/0095785, US-A 2018/0231411, US-A 2019/0154485, WO2009/134827, WO-A 2009/134829, WO-A 2009/134830, WO-A 2017/108283, WO-A 2017/194278, WO-A 2020/126287 or also in the international patent applications PCT/EP 2020/059050 or PCT/EP2020/071817, the measurement accuracy of the measuring system, with which the latter ultimately represents the measured variable to be detected, not least the mass flow, the density or the viscosity, in the corresponding measured values, can also, inter alia, be dependent on a quality of the measured substance; this occasionally also in such a way that fluctuations in the quality of the measured substance and/or deviations of the quality of the measured substance from a specification specified for the respective measuring system, for example in such a way that one or more substance parameters characterizing the quality of the measured substance deviate from a value range specified for this purpose, reduce the measurement accuracy of the measuring system significantly or lead to impermissibly high inaccuracy of the measurement results. Examples of such fluctuations in the (measured-substance) quality or deviations of the (measured-substance) quality from the (measured-substance) specification include a temporally changing loading of a measured substance with a foreign substance, such as solid particles and/or gas bubbles in a liquid, a formation of condensate in a gaseous measured substance, an outgassing of a liquid measured substance or, in the case of a measured substance formed as a dispersion, a temporally changing concentration of individual phases and/or components of the measured substance and/or an occasional segregation of components of the measured substance. In addition, the quality of the measured substance can occasionally also be subject to such changes which lead to impermissible deviations from a specification specified for the respective measured substance itself or the (processing) process concerned.

For the purpose of detecting such unwanted fluctuations and/or deviations of the (measured-substance) quality, US-A 2010/0095783, US-A 2010/0095784, US-A 2010/0095785, inter alia, propose that the quality of the measured substance be monitored by determining, based upon a drive signal causing a symmetric useful mode, and based upon the useful signal components of at least one of the vibration measurement signals generated thereby, a (modal) damping of the antisymmetric Coriolis modes and comparing it to threshold values correspondingly specified therefor, wherein the aforementioned damping is calculated only indirectly, i.e., based upon a time derivative of a previously determined (modal) damping of the useful mode. A disadvantage of such monitoring of the quality of the measured substance is, inter alia, that, for this purpose, the damping of the symmetric useful mode must initially be determined over a longer period of time, and therefore the damping of the antisymmetric Coriolis mode, and thus also the quality of the measured substance to be monitored can only be determined for a correspondingly much earlier point in time, possibly also delayed, or vice versa, only slow changes in the quality of the measured substance can be detected precisely.

SUMMARY

Proceeding from the aforementioned prior art, it is an object of the invention to improve vibronic measuring systems of the aforementioned type, not least also (standard) measuring systems, to the effect that fast changes and/or significant fluctuations in the quality of the measured substance are thus also detected as early and reliably as possible, i.e., for example, also correspondingly reported, and/or can be correspondingly taken into account in the determination of the measured values for the at least one measured variable.

In order to achieve the object, the invention consists in a vibronic measuring system, especially, a Coriolis mass flow measuring device or a Coriolis mass flow/density measuring device, for measuring and/or monitoring at least one measured variable, especially, a flow parameter, i.e., especially a mass flow and/or a volumetric flow and/or a flow rate, and/or a substance parameter, i.e., especially a density and/or a viscosity of a fluid measured substance, especially, of a gas, a liquid, or a dispersion. The measuring system according to the invention, which is designed, for example, as an in-line measuring device and/or a measuring device of compact design, comprises: a transducer with a tube assembly for conducting the flowing measured substance, with an exciter assembly for converting electrical power into mechanical power used to excite and maintain forced mechanical vibrations of the tube assembly, and with a sensor assembly for detecting mechanical vibrations of the tube assembly and for providing vibration measurement signals respectively representing vibration movements of the tube assembly, as well as a measuring system electronics unit, which is electrically coupled to the transducer, i.e., both to its exciter assembly and to its sensor assembly, especially, by means of electrical connecting lines, for example, formed by means of at least one microprocessor and/or arranged in electronics protective housing, for controlling the transducer and for evaluating vibration measurement signals provided by the transducer.

In the measuring system according to the invention, it is furthermore provided that the tube assembly has at least one tube, which is, for example, at least sectionally curved and/or at least sectionally straight, and/or a first tube, which tube extends from a first tube end to a second tube end with a tube length, for example of more than 100 mm, and has a lumen enclosed by a, for example metallic, tube wall and extending from the first tube end to the second tube end, and which tube is configured to be traversed by the measured substance at least in a flow direction from the first tube end to the second tube end and, meanwhile, to be allowed to vibrate, wherein, naturally, inherent in the tube, is a plurality of vibration modes (natural vibration forms) respectively having an associated resonance frequency (f1, f2, . . . , fx), in which modes the tube can perform or performs vibration movements respectively having one or more vibration antinodes and two or more vibration nodes, in such a way that vibration movements of the tube in a fundamental vibration mode, i.e., a first-order vibration mode (f1 mode), i.e., for example a first-order flexural vibration mode, have exactly one vibration antinode and two vibration nodes, and that vibration movements of the tube in a harmonic mode, i.e., a second-order or higher-order vibration mode (f2 mode, . . . fx mode), i.e., for example, a second-order or higher-order flexural vibration mode, have two or more vibration antinodes and three or more vibration nodes.

In the measuring system according to the invention, it is moreover provided that the exciter assembly have a vibration exciter, e.g., an electrodynamic vibration exciter, which is mechanically connected to the tube and is configured to convert electrical power with a temporally-variable electrical current into mechanical power in such a way that, at a drive point formed by means of the vibration exciter on the tube mechanically connected thereto, a temporally-variable drive force acts on the tube, e.g., in such a way that a line of action of the drive force is perpendicular to a normal of a drive cross-sectional area of the tube, wherein the vibration exciter is positioned and aligned such that a drive offset, i.e., a smallest distance between a drive cross-sectional area of the tube enclosed by an imaginary circumferential line of the tube passing through the drive point, and a specified reference cross-sectional area of the at least one tube, determined for example with an intact or original transducer, is not more than 3 mm, e.g., less than 2 mm, and/or less than 0.5% of the tube length, i.e., for example, less than 0.2% of the tube length, i.e., is, for example, equal to zero with an intact or original transducer, wherein a vibration node formed between two vibration antinodes of vibration movements of the at least one tube in a (second-order or higher-order) vibration mode (deviating from the first-order vibration mode) and (nominally) located, for example, at half the tube length, of said vibration movements is within the reference cross-sectional area.

In the measuring system according to the invention, it is moreover provided that the measuring system electronics unit be configured to energize the vibration exciter, i.e., to feed electrical power into the vibration exciter by means of an electrical drive signal having a temporally-variable electrical current, in such a way that the tube performs forced mechanical vibrations, e.g., flexural vibrations, at one or more vibration frequencies specified by the drive signal.

In the measuring system according to the invention, it is moreover provided that the sensor assembly have a first vibration sensor, e.g., an electrodynamic or optical first vibration sensor, which is positioned on the tube at a distance from the vibration exciter in the flow direction of, for example, more than 10 mm and/or more than one fifth of the tube length, i.e., for example, at least partially mechanically connected to the tube, and which is configured to detect vibration movements of the tube and convert them into a first vibration measurement signal representing said vibration movements, e.g., an electrical or optical first vibration measurement signal, for example, in such a way that the first vibration measurement signal contains one or more sinusoidal signal components respectively having a frequency corresponding to a vibration frequency of vibration movements of the tube, and it is furthermore provided that the sensor assembly have at least one second vibration sensor, e.g., an electrodynamic or optical second vibration sensor, which is positioned on the tube at a distance from the vibration exciter in the flow direction of, for example, more than 10 mm and/or more than one fifth of the tube length and/or at a distance from the first vibration sensor in the flow direction, i.e., is, for example, at least partially mechanically connected to the tube, and which is configured to detect vibration movements of the tube and convert them into a second vibration measurement signal representing said vibration movements, e.g., an electrical or optical second vibration measurement signal, for example, in such a way that the second vibration measurement signal contains one or more sinusoidal signal components respectively having a frequency corresponding to a vibration frequency of vibration movements of the tube.

In the measuring system according to the invention, it is moreover provided that the measuring system electronics unit be configured to receive and evaluate the first and second vibration measurement signals, i.e., for example, to determine and output measured values representing the at least one measured variable. In addition, in the measuring system according to the invention, it is furthermore provided that the measuring system electronics unit be configured both to provide the drive signal at least intermittently with a sinusoidal first (useful) current having a first (AC) frequency, in such a way that the tube performs at least partially, e.g., predominantly, first useful vibrations, i.e., mechanical vibrations forced by the (energized) vibration exciter, at a first useful frequency, i.e., a (vibration) frequency corresponding to the first (AC) frequency, for example, in such a way that the first useful frequency deviates from a resonance frequency, f1, the fundamental vibration mode, by less than 1% of said resonance frequency, f1, and/or by less than 1 Hz, and/or that the first useful frequency deviates from a resonance frequency, f2, of the second-order vibration mode by more than 5% of said resonance frequency, f2, and/or by more than 10 Hz, and/or that the first useful vibrations are suitable for causing, in the flowing measured substance, Coriolis forces that depend upon the mass flow, and that each of the first and second vibration signals respectively has a first useful signal component, i.e., a sinusoidal signal component having a (signal) frequency corresponding to the first useful frequency, and to determine, based upon at least the first useful signal components, e.g., based upon their (signal) frequency and/or based upon an amplitude of at least one of the first useful signal components, and/or based upon a phase angle of at least one of the first useful signal components, measured values representing the at least one measured variable, e.g., mass-flow measured values representing the mass flow of the measured substance and/or density measured values representing the density of the measured substance. Furthermore, in the measuring system according to the invention, the measuring system electronics unit is configured both to provide the drive signal at least intermittently, for example, during a test interval that lasts more than 10 ms and/or is time-limited and/or recurrently started, with a sinusoidal second (useful) current having a second (AC) frequency, in such a way that the second (AC) frequency, for example, for two or more vibration periods and/or a period of more than 10 ms, deviates from a resonance frequency, f2, of the second-order vibration mode by less than 1%, for example, by less than 0.1%, of said resonance frequency, f2, and/or by less than 1 Hz, for example, by less than 0.1 Hz, and that the tube performs, at least partially, for example, simultaneously with the first useful vibrations, and/or stationarily, i.e., for two or more vibration periods and/or a period of more than 10 ms, second useful vibrations having a constant, non-zero vibration amplitude, i.e., mechanical vibrations forced by the (energized) vibration exciter, at a second useful frequency, i.e., a (vibration) frequency corresponding to the second (AC) frequency, whereby each of the first and second vibration signals respectively has a second useful signal component, i.e., a sinusoidal signal component having a (signal) frequency corresponding to the second useful frequency, and to monitor, based upon at least one of the two useful signal components, for example, based upon the (signal) frequency thereof, and/or based upon a (signal) amplitude of at least one of the second useful signal components and/or based upon a phase angle of at least one of the second useful signal components, a quality of the measured substance, i.e., for example, to determine whether a fault of the measured substance, i.e., an unwanted change of one or more substance parameters of the measured substance, is present and/or whether, due to a fault of the measured substance, a measurement error is present in the determination of the measured values.

According to a second embodiment of the invention, it is furthermore provided that the first useful frequency deviate from a resonance frequency, f1, of the fundamental vibration mode by less than 1% of said resonance frequency, f1, and/or by less than 1 Hz.

According to a first embodiment of the invention, it is furthermore provided that the first useful frequency deviate from a resonance frequency, fr3, of a third-order vibration mode inherent in the at least one tube, i.e., for example, a third-order flexural vibration mode, in which vibration mode the vibration movements of the tube have exactly three vibration antinodes and two vibration nodes, by less than 1% of said resonance frequency, fr3, and/or by less than 1 Hz, i.e., for example, correspond to the resonance frequency, fr3. Developing this embodiment of the invention further, it is furthermore provided that a first vibration node of vibration movements of the at least one tube in the third-order vibration mode be located in the first tube end, and a second vibration node of the third-order vibration mode be located in the second tube end.

According to a third embodiment of the invention, it is furthermore provided that the harmonic mode correspond to a second-order vibration mode (f2 mode), i.e., for example, a second-order flexural vibration mode, in which second-order vibration mode the vibration movements of the tube have exactly two vibration antinodes and three vibration nodes. Developing this embodiment of the invention further, it is furthermore provided that a vibration node of said vibration movements that is formed between the two vibration antinodes of the vibration movements of the at least one tube in the second-order vibration mode and (nominally) located, for example, at half the tube length, be within the reference cross-sectional area, and/or that a main inertia axis of the at least one tube, which is perpendicular to the vibration direction of the vibration movements of the tube in the second-order vibration mode, be within the reference cross-sectional area of the at least one tube.

According to a fourth embodiment of the invention, it is furthermore provided that the drive offset correspond to a distance between an area centroid (center point) of the drive cross-sectional area of the tube and an area centroid (center point) of the reference cross-sectional area of the at least one tube.

According to a fifth embodiment of the invention, it is furthermore provided that a line of action of the drive force be perpendicular to a normal of a drive cross-sectional area of the tube.

According to a sixth embodiment of the invention, it is furthermore provided that an intersection line of two, mutually-orthogonal symmetry planes of the at least one tube be within the reference cross-sectional area.

According to a seventh embodiment of the invention, it is furthermore provided that a main inertia axis, perpendicular to the drive force, of the at least one tube be within the reference cross-sectional area of the at least one tube.

According to an eighth embodiment of the invention, it is furthermore provided that the measuring system electronics unit be configured to provide the second useful current of the drive signal at least intermittently simultaneously with the first (useful) current, e.g., in such a way that an amplitude of the first (useful) current is adjusted to not be less than an amplitude of the second (useful) current and/or that an amplitude of the second (useful) current is adjusted to more than 40%, e.g., not less than 50%, of an amplitude of the first (useful) current.

According to a ninth embodiment of the invention, it is furthermore provided that the measuring system electronics unit be configured to adjust the second (AC) frequency as a function of the first (AC) frequency, e.g., in such a way that the second (AC) frequency is within a frequency setting interval, of which an upper interval limit and/or a lower interval limit and/or a center frequency corresponds to a specified multiple of the first (AC) frequency, i.e., for example, a multiple of the first (AC) frequency corresponding to more than 230% of the first (AC) frequency and/or less than 300% of the first (AC) frequency.

According to a tenth embodiment of the invention, it is furthermore provided that the measuring system electronics unit have a first phase-locked loop (PLL1), e.g., a digital first phase-locked loop, used to adjust the first (AC) frequency, and that the measuring system electronics unit have a second phase-locked loop (PLL2), e.g., a digital second phase-locked loop, used to adjust the second (AC) frequency. Developing this embodiment of the invention further, it is furthermore provided that the measuring system electronics unit be configured to adjust a capture range of the second phase-locked loop (PLL2) by means of at least one output signal of the first phase-locked loop (PLL1), e.g., an output signal of a loop filter of the first phase-locked loop (PLL1), and/or based upon the first (AC) frequency.

According to an eleventh embodiment of the invention, it is furthermore provided that the measuring system electronics unit be configured for carrying out the monitoring of the quality of the measured substance based upon the second useful signal components, for example, based upon the (signal) frequency thereof, and/or based upon a (signal) amplitude of at least one of the second useful signal components and/or based upon a phase angle of at least one of the second useful signal components, to determine whether a present fault of the measuring system can be ascribed to a change, for example, an irreversible change, of one or more flow properties of the tube assembly, for example, due to a reduction in a flow cross-section of the tube assembly, for example, as a result of a blockage of one or more of the tubes and/or as a result of a deposit on an inner side of the tube wall of one or more of the tubes.

According to a twelfth embodiment of the invention, it is furthermore provided that the measuring system electronics unit be configured to determine a (modal) deflection of the first useful vibrations corresponding to a (signal) amplitude of one of the first useful signal components, for example, a difference of the (signal) amplitudes of the first useful signal components, i.e., for example, to determine, based upon at least one of the vibration measurement signals, deflection values representing the deflection of the first useful vibrations.

According to a thirteenth embodiment of the invention, it is furthermore provided that the measuring system electronics unit be configured to determine a (modal) deflection of the first useful vibrations corresponding to a (signal) amplitude of one of the second useful signal components, for example, a difference of the (signal) amplitudes of the second useful signal components, i.e., for example, to determine, based upon at least one of the vibration measurement signals, deflection values representing the deflection of the second useful vibrations.

According to a fourteenth embodiment of the invention, it is furthermore provided that the measuring system electronics unit be configured to determine a deflection ratio corresponding to a ratio of a (modal) deflection of the first useful vibrations and a (modal) deflection of the second useful vibrations, i.e., for example, to determine, based upon at least one of the vibration measurement signals, deflection ratio values representing the deflection ratio.

According to a fifteenth embodiment of the invention, it is furthermore provided that the measuring system electronics unit be configured to determine a (modal) damping of the first useful vibrations corresponding to a ratio of the (signal) amplitude of one of the first useful signal components, for example, a sum or a difference of the (signal) amplitudes of the first useful signal components, and a (signal) amplitude of the first (useful) current, i.e., for example, to determine, based upon the drive signal and at least one of the vibration measurement signals, damping values representing the damping of the first useful vibrations.

According to a sixteenth embodiment of the invention, it is furthermore provided that the measuring system electronics unit be configured to determine a (modal) damping of the second useful vibrations corresponding to a ratio of the (signal) amplitude of one of the second useful signal components, for example, a sum or a difference of the (signal) amplitudes of the second useful signal components, and a (signal) amplitude of the second (useful) current, i.e., for example, to determine, based upon the drive signal and at least one of the vibration measurement signals, damping values representing the damping of the second useful vibrations.

According to a seventeenth embodiment of the invention, it is furthermore provided that the measuring system electronics unit be configured to determine a damping ratio corresponding to a ratio of the (modal) damping of the first useful vibrations and the (modal) damping of the second useful vibrations, i.e., for example, to determine, based upon the drive signal and/or at least one of the vibration measurement signals, damping ratio values representing the damping ratio.

According to an eighteenth embodiment of the invention, it is furthermore provided that the measuring system electronics unit be configured to determine, based upon the drive signal and at least one of the vibration measurement signals, damping values representing a (modal) damping of the second useful vibrations, i.e., for example, to compare one or more of the damping values to a reference value (damping reference value) determined therefor in advance. Developing this embodiment of the invention further, it is furthermore provided that the measuring system electronics unit be configured for carrying out the monitoring of the quality of the measured substance, to compare one or more of the damping values to at least one reference value (damping reference value) determined therefor in advance and/or by means of an intact measuring system, for example, also to output, in the case of a deviation of one or more of the damping values from the reference value, a message representing this, for example, a message declared as a (fault) alarm, and/or that the measuring system electronics unit be configured for carrying out the monitoring of the quality of the measured substance based upon several of the damping values, to determine a temporal change, i.e., for example, a change trend and/or a change rate and/or a change velocity, of the damping of the second useful vibrations, i.e., for example, to determine an increasing fault with decreasing damping of the second useful vibrations and/or to output a message representing an increase of a fault, for example, a message declared as a (fault) alarm, and/or that the measuring system electronics unit be configured to determine, based upon a plurality of damping values, and, for example, also to output, a scatter measure, for example, an empirical variance and/or a span, for the damping of the second useful vibrations of the at least one tube, and/or, for carrying out the monitoring of the quality of the measured substance, to compare said scatter measure to one or more reference values specified therefor.

According to a nineteenth embodiment of the invention, it is furthermore provided that the measuring system electronics unit be configured to determine the resonance frequency f1 of the first vibration mode of the at least one tube, i.e., for example, to determine, based upon the drive signal and/or at least one of the vibration measurement signals, frequency values representing the resonance frequency.

According to a twentieth embodiment of the invention, it is furthermore provided that the measuring system electronics unit be configured to determine the resonance frequency f2 of the second vibration mode of the at least one tube, i.e., for example, to determine, based upon the drive signal and/or at least one of the vibration measurement signals, frequency values representing the resonance frequency.

According to a twenty-first embodiment of the invention, it is furthermore provided that the measuring system electronics unit be configured to determine a resonance frequency ratio corresponding to a ratio of the resonance frequency of the first vibration mode of the at least one tube and the resonance frequency of the second vibration mode of the at least one tube, i.e., for example, to determine, based upon the first and second (AC) frequencies of the drive signal and/or based upon the signal frequencies of the first and second useful signal components of at least one of the vibration measurement signals, frequency ratio values representing the resonance frequency ratio.

According to a twenty-second embodiment of the invention, it is furthermore provided that the measuring system electronics unit be configured to determine, based upon the drive signal and/or at least one of the vibration measurement signals, frequency values representing the resonance frequency of the second vibration mode of the at least one tube, i.e., for example, to compare one or more of the frequency values to one or more reference values specified therefor, and/or to use several of the frequency values to determine a scatter measure for the resonance frequency of the second vibration mode of the at least one tube. Developing this embodiment of the invention further, it is furthermore provided that the measuring system electronics unit be configured to determine, based upon a plurality of frequency values, and, for example, also to output, a scatter measure for the resonance frequency of the second vibration mode of the at least one tube and/or, for carrying out the monitoring of the quality of the measured substance, to compare said scatter measure to a reference value specified therefor and, in the case of a deviation of the scatter measure from the reference value, to output a message representing this.

According to a twenty-third embodiment of the invention, it is furthermore provided that the measuring system electronics unit be configured to determine, based upon the drive signal and/or at least one of the vibration measurement signals, frequency ratio values representing a ratio of the resonance frequency of the first vibration mode of the at least one tube and the resonance frequency of the second vibration mode of the at least one tube, i.e., for example, to compare one or more of the frequency ratio values to one or more reference values specified therefor, and/or to use several of the frequency ratio values to determine a scatter measure for the resonance frequency ratio of the at least one tube. Developing this embodiment of the invention further, it is furthermore provided that the measuring system electronics unit be configured for carrying out the monitoring of the quality of the measured substance, to compare one or more of the frequency ratio values to at least one reference value (frequency ratio reference value) determined therefor in advance, and, for example, also to output, in the case of a deviation of one or more of the frequency ratio values from the reference value, a message representing this, for example, a message declared as a (fault) alarm, and/or that the measuring system electronics unit be configured to determine, based upon a plurality of frequency ratio values, and, for example, also to output, a scatter measure, for example, an empirical variance and/or a span, for the resonance frequency ratio of the at least one tube and/or, for carrying out the monitoring of the quality of the measured substance, to compare said scatter measure to a reference value specified therefor and, in the case of a deviation of the scatter measure from the reference value, to output a message representing this.

According to a twenty-fourth embodiment of the invention, it is furthermore provided that the measuring system electronics unit be configured to determine, based upon the vibration measurement signals, phase difference values representing a phase difference of the second useful signal components, i.e., a difference between a phase angle of the second useful signal component of the first vibration measurement signal and a phase angle of the second useful signal component of the second vibration measurement signal, i.e., for example, to compare one or more of the phase difference values to a reference value (phase difference reference value) determined therefor in advance and/or to use several of the phase difference values to determine a scatter measure for the phase difference of the second useful signal components of the at least one tube. Developing this embodiment of the invention further, it is furthermore provided that the measuring system electronics unit be configured for carrying out the monitoring of the quality of the measured substance, to compare one or more of the phase difference values to at least one reference value (phase difference reference value) determined therefor in advance, and, for example, also to output, in the case of a deviation of one or more of the phase difference values from the reference value, a message representing this, for example, a message declared as a (fault) alarm, and/or that the measuring system electronics unit be configured to determine, based upon a plurality of phase difference values, and, for example, also to output, a scatter measure, e.g., an empirical variance and/or a span, for the phase difference of the second useful signal components and/or, for carrying out the monitoring of the quality of the measured substance, to compare said scatter measure to a reference value specified therefor and, in the case of a deviation of the scatter measure from the reference value, to output a message representing this.

According to a twenty-fifth embodiment of the invention, it is furthermore provided that the measuring system electronics unit be configured to determine, based upon at least one of the vibration measurement signals, deflection ratio values representing a ratio of a deflection (amplitude) of the first useful vibrations and a deflection (amplitude) of the second useful vibrations, i.e., for example, to compare one or more of the deflection ratio values to one or more reference values specified therefor, and/or to use several of the deflection ratio values to determine a scatter measure for the deflection ratio of the at least one tube. Developing this embodiment of the invention further, it is furthermore provided that the measuring system electronics unit be configured for carrying out the monitoring of the quality of the measured substance, to compare one or more of the deflection ratio values to at least one reference value (deflection ratio reference value) determined therefor in advance, and, for example, also to output, in the case of a deviation of one or more of the deflection ratio values from the reference value, a message representing this, for example, a message declared as a (fault) alarm, and/or that the measuring system electronics unit be configured to determine, based upon a plurality of deflection ratio values, and, for example, also to output, a scatter measure, for example, an empirical variance and/or a span, for the deflection ratio of the at least one tube and/or, for carrying out the monitoring of the quality of the measured substance, to compare said scatter measure to a reference value specified therefor and, in the case of a deviation of the scatter measure from the reference value, to output a message representing this.

According to a twenty-sixth embodiment of the invention, it is furthermore provided that the measuring system electronics unit be configured to provide the second (useful) current (eN2) with a specified (current) amplitude. Developing this embodiment of the invention further, it is furthermore provided that the measuring system electronics unit be configured for carrying out the monitoring of the quality of the measured substance, to recurrently compare the (signal) amplitude of at least one of the second useful signal components to a reference value (amplitude reference value) dependent upon the (signal) amplitude of the second (useful) current and/or specified therefor, i.e., for example, a reference value corresponding to a (signal) amplitude of the at least one second useful signal component determined at the specified (current) amplitude of the second (useful) current, i.e., for example, to determine whether or to what extent the (signal) amplitude deviates from said reference value.

According to a twenty-seventh embodiment of the invention, it is furthermore provided that the measuring system electronics unit be configured, e.g., for carrying out the monitoring of the quality of the measured substance, to calculate, based upon the second useful signal components of at least one of the vibration measurement signals, for example, based upon the (signal) frequency thereof, and/or based upon a (signal) amplitude of at least one of the second useful signal components and/or based upon a phase angle of at least one of the second useful signal components, one or more characteristic number values for at least one measured-substance characteristic number, which characterizes a state of the measured substance, for example, in such a way that said measured-substance characteristic number depends upon one or more parameters of a system function of the measuring system provided between the second useful current component of the drive signal and the second useful signal component of the at least one vibration measurement signal. Developing this embodiment of the invention further, it is furthermore provided that the measuring system electronics unit be configured for carrying out the monitoring of the quality of the measured substance, to respectively compare one or more characteristic number values for the measured-substance characteristic number to one or more reference values determined for the measured-substance characteristic number, for example, by the manufacturer of the measuring system and/or during the production and/or a start-up of the measuring system and/or as a function of the drive signal, for example, to evaluate and/or quantify a deviation of one or more of the characteristic number values from one or more of the reference values. Furthermore, the measuring system electronics unit can moreover be configured to determine whether one or more characteristic number values for the measured-substance characteristic number are greater than the at least one reference value for the measuring-system characteristic number, i.e., for example, if one or more characteristic number values for the measured-substance characteristic number are greater than one or more reference values representing a reduced quality of the measured substance and/or greater than one reference values representing a measured substance outside a specification, to output a message representing this, for example, a message declared as a (fault) alarm.

According to a twenty-eighth embodiment of the invention, it is furthermore provided that the measuring system electronics unit is configured for monitoring the quality of the measured substance, based upon the second useful signal components, for example based upon both the second useful signal components and the first useful signal components, to determine whether and/or to what extent a fault of the measured substance, for example also a fault reducing a functionality of the measuring system and/or a fault causing a malfunction of the measuring system and/or a fault causing a measurement error of the measured values, is present, for example as a result of an (undesired) segregation of the measured substance and/or as a result of an (undesired) loading of the measured substance by one or more foreign substances.

According to a twenty-ninth embodiment of the invention, it is furthermore provided that the measuring system electronics unit be configured for carrying out the monitoring of the quality of the measured substance, based upon the at least one second useful signal component, for example, based upon the (signal) frequency thereof, and/or based upon a (signal) amplitude of at least one of the second useful signal components and/or based upon a phase angle of at least one of the second useful signal components, to determine whether and/or to what extent, due to a fault of the measured substance, a measurement error is present in the determination of the measured values. Developing this embodiment of the invention further, it is furthermore provided that the measuring system electronics unit be configured to detect a fault of the measured substance, and to output a message representing said fault of the measured substance representing, for example, a message declared as a (fault) alarm.

According to a thirtieth embodiment of the invention, it is furthermore provided that the measuring system electronics unit be configured to follow a change in a density of the measured substance conducted in the tube with a change in the first (AC) frequency of the drive signal, and that the measuring system electronics unit be configured to generate, based upon the first (AC) frequency of the drive signal and/or based upon the signal frequency of the first useful signal component of at least one of the vibration signals, density measured values representing the density.

According to a thirty-first embodiment of the invention, it is furthermore provided that the first useful signal components of the first and second vibration measurement signals follow a change in a mass flow of the measured substance conducted in the tube with a change in a phase difference of the first useful signal components, i.e., a difference between a phase angle of the first useful signal component of the first vibration measurement signal and a phase angle of the first useful signal component of the second vibration measurement signal, and that the measuring system electronics unit be configured to generate, based upon the phase difference of the first useful signal components, mass-flow measured values representing the mass flow. Developing this embodiment of the invention further, it is furthermore provided that the measuring system electronics unit be configured for example, for carrying out the monitoring of the quality of the measured substance, to check or to calibrate, based upon the second useful signal components of at least one of the vibration measurement signals, for example, based upon a phase angle of at least one of the second useful signal components and/or based upon a phase difference of the second useful signal components, a (mass-flow-to-phase-difference) characteristic curve function of the transducer, according to which the phase difference of the first useful signal components depends upon the mass flow, and/or a (mass-flow-to-measured-value) characteristic curve function of the measuring system, according to which mass-flow measured values determined based upon the phase difference of the first useful signal components depend upon the mass flow.

According to a thirty-second embodiment of the invention, it is furthermore provided that the measuring system electronics unit be configured to provide the drive signal (e1) with the second (useful) current during a test interval that lasts, for example, more than 10 ms and/or is time-limited and/or recurrently started, with a sinusoidal having a second (AC) frequency, for example to provide it in such a way that the second (useful) current (eN2) is non-volatile or stationary, i.e., has a (substantially) constant, non-zero amplitude for two or more vibration periods and/or a period of more than 10 ms (milliseconds). Developing this embodiment of the invention further, it is furthermore provided that the measuring system electronics unit be configured to determine, during the test interval, based upon the second useful signal components, e.g., based upon the (signal) frequency thereof, and/or based upon a (signal) amplitude of at least one of the second useful signal components (s1N2) and/or based upon a phase angle of at least one of the second useful signal component (s1N2), measured values representing the at least one measured variable, and/or that the test interval respectively last for longer than 100 ms (milliseconds), e.g., not less than 1 s (second), and/or that the measuring system electronics unit be configured to automatically, e.g., in a time-controlled manner, start and/or end the test interval, e.g., recurrently, and/or that the measuring system electronics unit be configured to receive and execute one or more commands that start the test interval.

According to a thirty-third embodiment of the invention, it is furthermore provided that the tube wall consist of a steel, for example, a stainless steel, duplex steel, or super duplex steel, of a titanium alloy and/or a zirconium alloy, for example, a Zircaloy, and/or a tantalum alloy. According to a thirty-fourth embodiment of the invention, it is furthermore provided that the tube have a caliber (inner tube diameter) that is more than 0.1 mm, i.e., for example, more than 0.5 mm. Developing this embodiment of the invention further, it is furthermore provided that the tube have a caliber-to-tube-length ratio that is more than 0.08, e.g., more than 0.1, and/or less than 0.25, e.g., less than 0.2, and/or that the tube length of the tube be more than 200 mm, e.g., more than 500 mm, and/or less than 2,000 mm, e.g., less than 1,500 mm, and/or that the tube have a caliber that is more than 10 mm, i.e., for example, more than 15 mm.

According to a thirty-fifth embodiment of the invention, it is furthermore provided that, apart from the vibration exciter, the exciter assembly have no further vibration exciter connected to the tube.

According to a thirty-sixth embodiment of the invention, it is furthermore provided that the vibration exciter be positioned and aligned such that the drive offset is less than 0.5 mm, i.e., for example, zero, or that the area centroid of the drive cross-sectional area of the tube correspond to or coincide with the drive reference point.

According to a thirty-seventh embodiment of the invention, it is furthermore provided that each of the first-order and second-order vibration modes of the tube respectively have a first vibration node located in the first tube end of the at least one tube and a second vibration node located in the second tube end of the at least one tube.

According to a thirty-eighth embodiment of the invention, it is furthermore provided that the tube be curved sectionally, for example, in the shape of a circular arc and/or V, for example, in such a way that the tube has a central vertex arc segment and/or that exactly one main inertia axis of the at least one tube is within the reference cross-sectional area of the at least one tube.

According to a thirty-ninth embodiment of the invention, it is furthermore provided that the tube be straight sectionally, e.g., over the entire tube length, e.g., in such a way that three main inertia axes of the at least one tube are within the reference cross-sectional area of the at least one tube, and/or a center of mass is within the reference cross-sectional area of the at least one tube.

According to a fortieth embodiment of the invention, it is furthermore provided that the vibration exciter be formed by means of a vibration coil having, for example, an air coil and an armature.

According to a forty-first embodiment of the invention, it is furthermore provided that each of the first and second vibration sensors be respectively formed by means of a plunger coil having, for example, an air coil and an armature.

According to a forty-second embodiment of the invention, it is furthermore provided that the vibration exciter have a magnetic armature, formed, for example, by means of a permanent magnet, and a coil flooded by the magnetic field of the armature, i.e., for example, an air coil. Developing this embodiment of the invention further, it is furthermore provided that the magnetic armature be mechanically connected to the at least one tube to form the drive point, and/or that the coil be electrically connected to the measuring system electronics unit and be configured to receive the drive signal and to conduct the first and second (useful) currents thereof.

According to a forty-third embodiment of the invention, it is furthermore provided that the measuring system electronics unit have a non-volatile, electronic data memory that is configured to store digital data, e.g., even without an applied operating voltage.

According to a first further development of the invention, it is furthermore provided that the tube assembly have at least one second tube, which is, for example, at least sectionally curved and/or at least sectionally straight, and/or is structurally identical to the first tube and/or is at least sectionally parallel to the first tube.

According to a first embodiment of the first development, it is furthermore provided that the second tube extend with a tube length from a first tube end to a second tube end and have a lumen, which is enclosed by a tube wall, e.g., a metallic tube wall, and extends from the first tube end to the second tube end, and that the second tube be configured to be traversed by the measured substance, e.g., simultaneously with the first tube, at least in a flow direction from the first tube end to the second tube end and, meanwhile, to be allowed to vibrate.

According to a second embodiment of the first development, it is furthermore provided that a plurality of vibration modes (natural vibration forms) respectively having an associated resonance frequency be inherent in the second tube, in which modes the second tube can perform or performs vibration movements respectively having one or more vibration antinodes and two or more vibration nodes, e.g., in such a way that vibration movements of the second tube in the second-order vibration mode (f1 mode) are opposite, e.g., in opposition, to the vibration movements of the first tube in the second-order vibration mode (f2 mode), and/or that vibration movements of the second tube in the first-order vibration move (f1 mode) are opposite, e.g., in opposition, to the vibration movements of the first tube in the first-order vibration mode. Developing this embodiment of the invention further, it is furthermore provided that a resonance frequency of the first-order vibration mode of the first tube be equal to a resonance frequency of the first-order vibration mode (f1 mode) of the second tube, and that a resonance frequency of the second-order vibration mode of the first tube be equal to a resonance frequency of the second-order vibration mode of the second tube.

According to a third embodiment of the first development, it is furthermore provided that the first vibration sensor be positioned both on the first tube and on the second tube, i.e., for example, be mechanically connected partially to the first tube and partially to the second tube, and that the first vibration sensor be configured to detect vibration movements, i.e., for example, vibration movements in opposition, both of the first tube and of the second tube, e.g., differentially, and convert them into the first vibration measurement signal in such a way that the vibration measurement signal represents vibration movements, e.g., vibration movements in opposition, of the first and second tubes.

According to a fourth embodiment of the first development, it is furthermore provided that the second vibration sensor be positioned both on the first tube and on the second tube, i.e., for example, be mechanically connected partially to the first tube and partially to the second tube, and that the second vibration sensor be configured to detect vibration movements, i.e., for example, vibration movements in opposition, both of the first tube and of the second tube, e.g., differentially, and convert them into the second vibration measurement signal in such a way that the vibration measurement signal represents vibration movements, e.g., vibration movements in opposition, of the first and second tubes.

According to a fifth embodiment of the first development, it is furthermore provided that the tube assembly have a first, and/or inlet-side, flow divider, which is, for example, used as a line-branching unit and has at least two flow openings, and that the tube assembly have a second, and/or outlet-side, flow divider, which is, for example, structurally identical to the first flow divider and/or used as a line-merging unit, and has at least two flow openings. Developing this embodiment of the invention further, it is furthermore provided that each of the first and second tubes of the tube assembly be respectively connected to each of the first and second flow dividers, e.g., forming fluidically parallel flow channels, in such a way that the first tube opens with its first tube end into a first flow opening of the first flow divider and with its second tube end into a first flow opening of the second flow divider, and the second tube opens with its first tube end into a second flow opening of the first flow divider and with its second tube end into a second flow opening of the second flow divider.

According to a sixth embodiment of the first development, it is furthermore provided that the vibration exciter be mechanically connected both partially to the first tube and partially to the second tube.

According to a seventh embodiment of the first development, it is furthermore provided that the vibration exciter be configured to act differentially on the first and second tubes, e.g., in such a way that the first and second tubes simultaneously perform opposite, forced mechanical vibrations of equal frequency, and/or that the vibration exciter be configured to convert electrical power with a temporally-variable electrical current into mechanical power such that a temporally-variable drive force acts on the second tube at a drive point formed by means of the vibration exciter on the second tube mechanically connected thereto, e.g., simultaneously and/or oppositely to the drive force acting on the first tube at the drive point formed by means of the vibration exciter on the first tube mechanically connected thereto, and/or that the vibration exciter be configured to simultaneously convert electrical power fed in by means of the electrical drive signal into forced mechanical vibrations of the first and second tubes, e.g., in such a way that the first and second tubes simultaneously perform forced mechanical vibrations at the first useful frequency and/or at the second useful frequency.

According to a second development of the invention, the measuring system further comprises an electronics protective housing for the measuring system electronics unit, which protective housing is, for example, fastened to a transducer protective housing of the transducer and/or is metallic.

According to a third development of the invention, the measuring system further comprises a transducer protective housing, which is, for example, metallic, wherein the transducer protective housing and tube assembly are fastened to one another—for example, detachably.

A basic idea of the invention consists in actively, i.e., especially non-volatilely or stationarily, exciting or attempting to excite, in the case of vibronic measuring systems of the type in question, for the purpose of a monitoring of the quality of a measured substance conducted therein, by means of the at least one vibration exciter, useful vibrations, i.e., for example, flexural vibrations, according to such a natural vibration mode of the at least one tube, which mode has a vibration node located at said vibration exciter or in the immediate vicinity thereof. In measuring systems, and not least also marketed (standard) measuring systems, with a single vibration exciter acting centrally on the tube, the aforementioned vibration mode corresponds to a second-order vibration mode, i.e., for example, a second-order flexural vibration mode. Due to the resulting very low drive offset, the aforementioned useful vibrations nominally have only a very low amplitude or no amplitude at all, even when excited at the respective resonance frequency of the vibration mode. On the other hand, however, any change in the drive offset, i.e., a change associated with a displacement of the aforementioned vibration node closest to the vibration exciter, leads to the amplitude changing correspondingly with the same excitation in comparison to the initially measured amplitude; this especially such that the amplitude likewise increases correspondingly when the drive offset increases. The change in the drive offset in turn can result from an increasingly less symmetric distribution of the mass and/or viscosity of the measured substance within the at least one tube, which is associated with the change in the (measured-substance) quality, or corresponding changes in the modal mass and/or modal damping especially in such a way that the drive offset increases with reduced (measured-substance) quality.

For the purpose of monitoring the quality of the measured substance, the corresponding vibration responses, i.e., the vibration responses generated by excitation of the second-order vibration mode, or (system) parameters characterizing them, can be very easily determined recurrently during operation of the measuring system and compared to corresponding reference vibration responses ("fingerprint") or reference values therefor, in such a way that increased deviations, or deviations exceeding a specified tolerance measure, of the corresponding reference values detect, and possibly also report, the presence of a fault of the measured substance; this advantageously also simultaneously with the actual measuring operation, without considerably influencing the latter or without having to interrupt the measuring operation for a longer duration for this purpose.

Another advantage of the invention consists in realizing the monitoring according to the invention of the quality of the measured substance, even using largely, and possibly also exclusively, the proven designs for conventional vibronic measuring systems, and not least also for the transducers installed therein up until now, while likewise largely retaining proven technologies and architectures of established measuring system electronics units; for example, also in such a way that conventional, and possibly also already installed, measuring systems can be retrofitted by corresponding reprogramming of the respective measuring system electronics unit.

The invention as well as advantageous embodiments thereof are explained in more detail below based upon exemplary embodiments shown in the figures of the drawing. Identical or identically acting or identically functioning parts are provided with the same reference signs in all figures; for reasons of clarity or if it appears sensible for other reasons, reference signs mentioned before are dispensed with in subsequent figures. Further advantageous embodiments or developments, especially, combinations of partial aspects of the invention that were initially explained only separately, furthermore emerge from the figures of the drawing and/or from the claims themselves.

DETAILED DESCRIPTION

Figure 1:
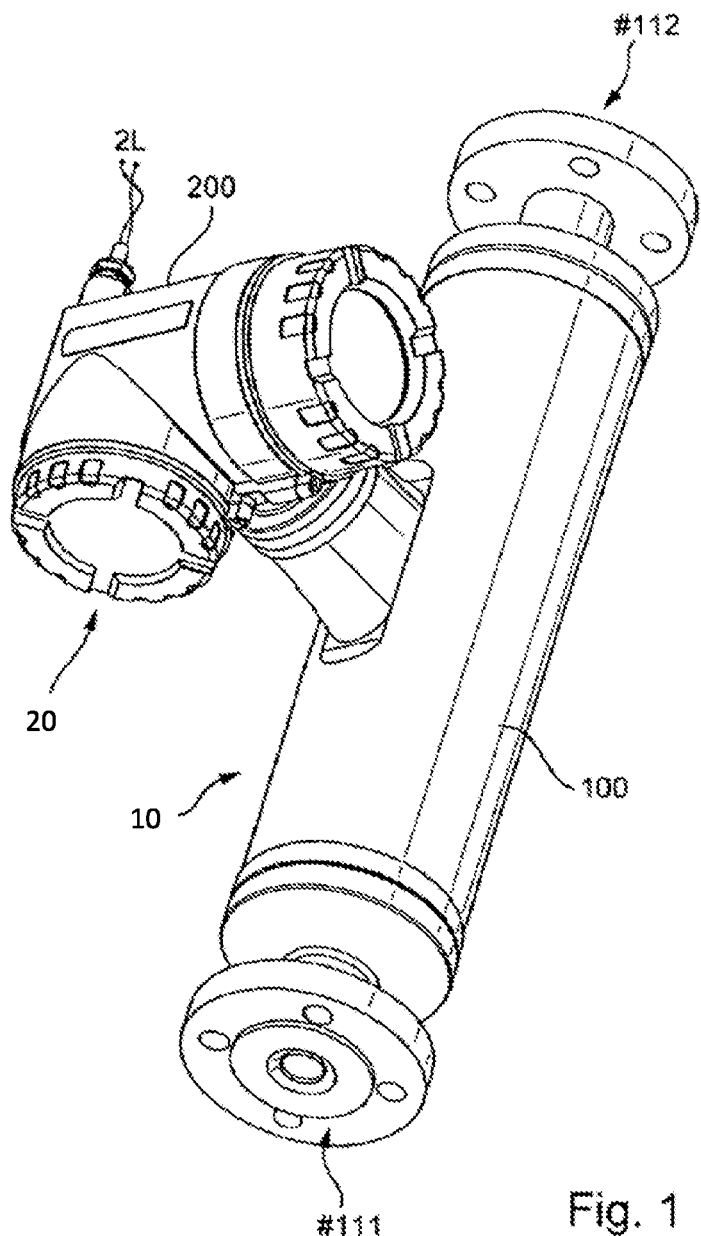
FIG. 1 shows an isometric view of an exemplary embodiment of a vibronic measuring system.
Figure 2:
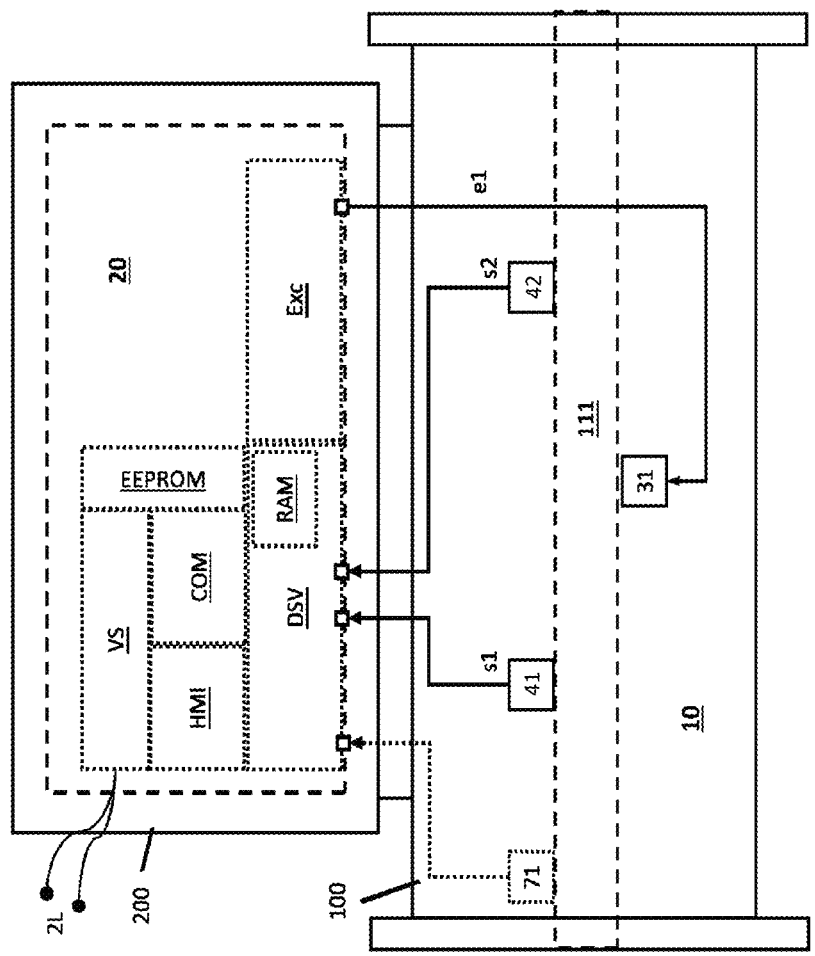
FIG. 2 shows a schematic, in the manner of a block diagram, of an exemplary embodiment of a vibration-type transducer suitable for a vibronic measuring system according to FIG. 1, and a measuring system electronics unit electrically coupled thereto.
Figure 3:
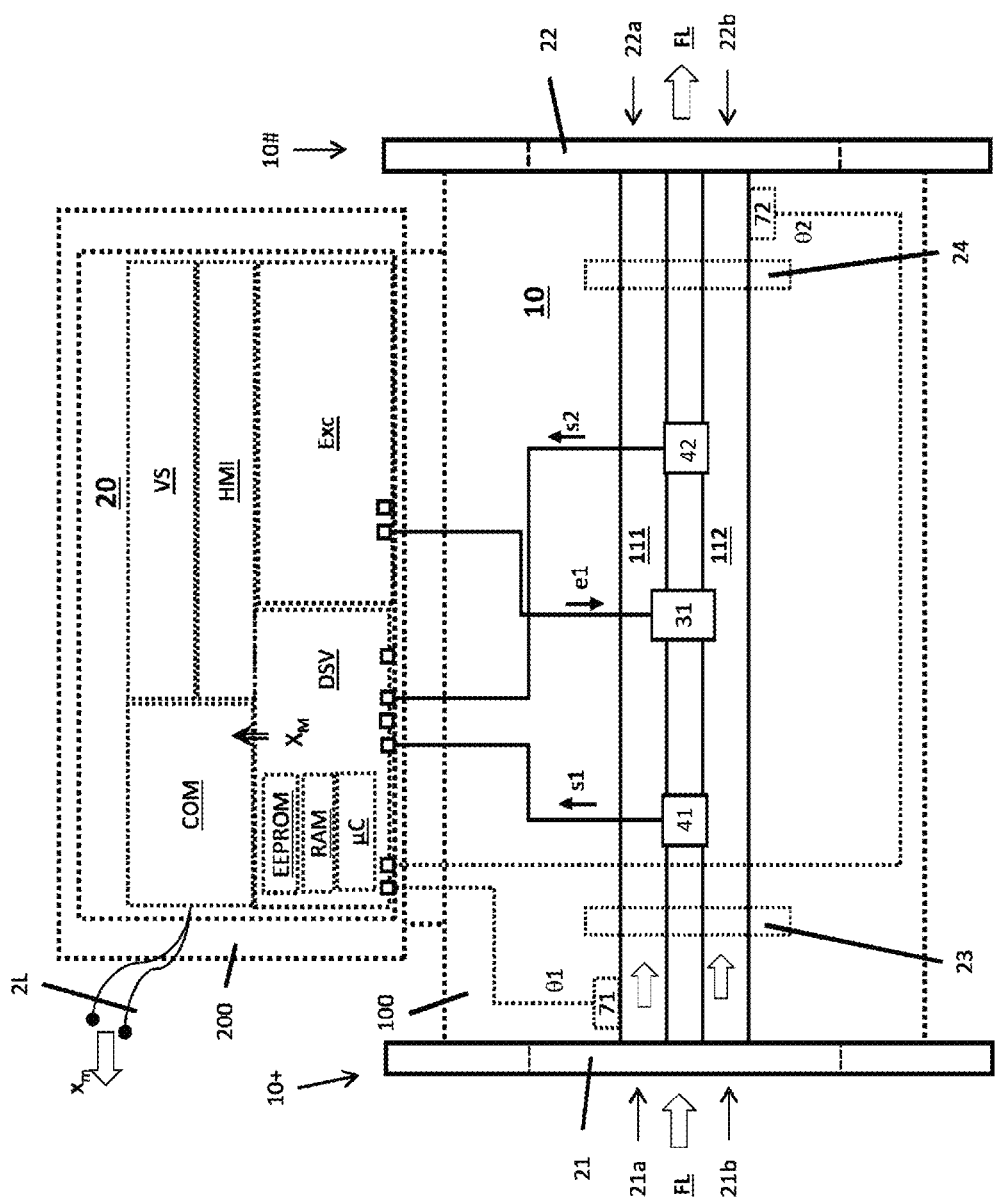
FIG. 3 shows a schematic, in the manner of a block diagram, of a further exemplary embodiment of a vibration-type transducer suitable for a vibronic measuring system according to FIG. 1, and a measuring system electronics unit electrically coupled thereto.

FIG. 1 or 2 and 3 schematically show exemplary embodiments or embodiment variants for a vibronic measuring system used to measure and/or monitor at least one, especially temporally-variable, measured variable of a fluid, e.g., at least intermittently flowing and/or at least intermittently two- or multi-phase or inhomogeneous, measured substance FL, wherein the measured variable can, for example, be a flow parameter, such as a mass flow m, a volumetric flow and/or a flow rate, or, for example, a substance parameter, such as a density p and/or a viscosity of the measured substance FL. The measuring system is especially provided or configured to be integrated into the course of a process line conducting a fluid FL used as a measured substance, i.e., for example, a gas, a liquid, or a dispersion, and to be at least intermittently traversed during operation by the fluid FL supplied or discharged via the process line. Moreover, the measuring system is provided to determine, i.e., especially to calculate and/or output, measured values $X_M$, and optionally also digital measured values, (chronologically successively) quantifying the at least one physical measured variable. The process line may, for example, be a tube line, i.e., for example, a tube line of a filling plant, a refueling device, or another industrial plant.

As shown respectively in FIGS. 1, 2, and 3, or readily apparent from their combination, the measuring system comprises a vibration-type transducer 10, i.e., a transducer with a tube assembly formed by means of at least one (first) or several tubes for conducting the measured substance, an exciter assembly (31) for converting electrical power to excite and maintain forced mechanical vibrations of the at least one tube, and a sensor assembly (41, 42) for detecting mechanical vibrations of the tube assembly and for providing vibration measurement signals (s1, s2), e.g., electrical or optical vibration measurement signals, respectively representing vibration movements of the tube assembly, i.e., especially of the one or more tubes thereof. In addition, the measuring system furthermore comprises a measuring system electronics unit 20, which is electrically coupled to the transducer 10, i.e., both to the aforementioned exciter assembly of the transducer and to the aforementioned sensor assembly of the transducer, i.e., for example, by means of corresponding electrical connecting lines, especially, formed by means of at least one microprocessor (pC) and/or arranged in an electronics protective housing (200) and/or used as a transmitter for controlling the transducer, i.e., especially to cause the aforementioned mechanical vibration of the at least one tube and to evaluate vibration measurement signals supplied by the transducer, i.e., for example, to determine the aforementioned measured values.

According to a further embodiment of the invention, the measuring system furthermore comprises a support frame 100, especially a bending- and/or torsion-resistant support frame, wherein, as is also schematically shown in FIG. 1, 2, or 3, said support frame 100 and the tube assembly are fastened to one another—for example, by material bonding or also detachably. In order to protect the transducer or its components from harmful environmental influences, to avoid undesired sound emissions by the vibrating tubes, or to collect measured substance escaping from a leak-tight tube assembly, the aforementioned support frame 100 can also be designed, as quite customary in vibronic measuring systems of the type in question, as a transducer protective housing that surrounds the tube assembly, together with the exciter assembly and sensor assembly, e.g., also in such a way that said transducer protective housing is metallic and/or has a compressive strength that is greater than a greatest compressive strength of the at least one tube of the tube assembly and/or is more than 50 bar. In addition, the measuring system electronics unit 20 can also be accommodated, as quite customary in measuring systems of the type in question, within an electronics protective housing 200, which is, for example, fastened to the aforementioned support frame or transducer protective housing of the transducer and/or is metallic.

The at least one tube of the tube assembly can be straight at least sectionally, i.e., especially hollow cylindrical, and/or curved at least sectionally, e.g., in such a way that said tube has a central vertex arc segment, i.e., especially is substantially V-shaped or has a V-shaped silhouette, and/or that the tube ultimately has a tubular shape located in a single (tube) plane. As indicated in FIG. 2, the at least one tube extends from a first tube end to a second tube end with a tube length corresponding to a length of an imaginary center line of the tube, e.g., of more than 100 mm, and the tube has a lumen, which is enclosed by a tube wall and extends from the first tube end to the second tube end. According to a further embodiment of the invention, the tube length of the tube is more than 200 mm, e.g., also more than 500 mm, and/or less than 2,000 mm—for example, also less than 1,500 mm. In the case of an at least sectionally curved tube, the aforementioned tube length corresponds to an extended or unwound length of the tube, and the tube can be manufactured by bending a tubular, semi-finished product. According to a further embodiment of the invention, the tube wall of the at least one tube consists of a metal, i.e., for example, a steel, especially a stainless steel, duplex steel, or super duplex steel, a titanium alloy and/or a zirconium alloy, especially a Zircaloy, and/or a tantalum alloy and/or a nickel-based alloy. Moreover, the at least one tube of the tube assembly can be designed in one piece—for example, in such a way that the tube is produced seamlessly or (at least in the case of a tube wall made of metal) with a single welded seam. According to a further embodiment of the invention, the at least one tube of the tube assembly has a caliber (inner tube diameter) that is more than 0.1 mm, i.e., for example, also more than 0.5 mm, and/or the tube wall of the at least one tube has a smallest wall thickness that is not less than 0.5 mm, e.g., also more than 1.5 mm, and this especially such that the wall thickness of the tube wall is substantially uniform. According to a further embodiment of the invention, the tube has a caliber-to-tube-length ratio that is more than 0.08, especially, more than 0.1, and/or less than 0.25, especially, less than 0.2. Incidentally, the at least one tube or each of the tubes of the tube assembly may, however, also assume any other one of the geometric shapes and/or dimensions customary in conventional (standard) vibronic measuring systems, i.e., for example, 1 mm, 2 mm, 5 mm, 10 mm, 15 mm, or even more, and/or may be produced from further materials customary for this purpose.

According to a further embodiment of the invention, the tube assembly of the transducer 10 has at least one second tube 112, as shown schematically in FIG. 3. The tube 112 may be at least sectionally curved and/or at least sectionally straight. Moreover, the tube 112, as indicated in FIG. 3, may, for example, also be designed structurally identically to the tube 111 and/or be arranged in parallel to the tube 111 at least sectionally. The tube 112 likewise extends, like the tube 111, from a first tube end to a second tube end with a tube length and likewise has, like the tube 111, a lumen, which is enclosed by a tube wall, e.g., a metallic tube wall, and extends from the first tube end to the second tube end. Moreover, the tube 112 is likewise designed to be traversed by measured substance or a partial volume thereof at least in a flow direction from the first tube end to the second tube end, especially simultaneously with the first tube, and, meanwhile, to be allowed to vibrate. In addition, the tube assembly can furthermore have a first, and/or inlet-side, flow divider 21, which is, for example, used as a line-branching unit here, and has at least two flow openings, and a second, and/or outlet-side, flow divider 22, which is, for example, structurally identical to the aforementioned flow divider 21 and/or used as a line-merging unit, and has likewise at least two flow openings, and each of the tubes 111, 112 of the tube assembly can then respectively be connected to each of the first and second flow dividers to form two, fluidically parallel flow channels, e.g., in such a way that the tube 111 opens with its first tube end into a first flow opening 21a of the first flow divider 21 and with its second tube end into a first flow opening 22a of the second flow divider 22, and that the second tube 112 opens with its first tube end into a second flow opening 21b of the first flow divider 21 and with its second tube end into a second flow opening 22b of the second flow divider 22. The tube length of the tube 111 may, for example, be equal to the tube length of the tube 112. Furthermore, the tube assembly may also have further tubes, i.e., for example, two further tubes, and therefore, as also shown in, inter alia, the above-mentioned U.S. Pat. No. 5,602,345, WO-A 96/08697, US-A 2017/0356777, WO-A 2019/081169, or WO-A 2019/081170, a total of four tubes. Accordingly, both the flow divider 21 and the flow divider 22 respectively have, especially exactly, four flow openings, and each of the tubes of the tube assembly can be respectively connected to each of the flow dividers 21, 22 to form four, fluidically parallel flow paths. In the aforementioned case in which the tube assembly has four tubes, the tubes may, for example, also be designed such that they are structurally identical only in pairs, i.e., for example, the tube lengths are selected to be of equal size only in pairs. Moreover, for the case in which the tube assembly has two or more tubes, the wall of each of the tubes may, for example, consist of the same material, as is quite customary in the case of tube assemblies of the type in question or transducers or measuring systems formed therewith; this, for example, also in such a way that the tube wall of each of the tubes of the tube assembly have a wall thickness that is equal to a wall thickness of the other tube or of each of the other tubes and/or that each of the tubes of the tube assembly have a caliber, i.e., an inner diameter, that is equal to a caliber of the other tube or of each of the other tubes.

As already indicated, the tube assembly or the transducer MW formed therewith is provided especially to be connected via an inlet end 10+, e.g., also enclosed by a first connecting flange, of the tube assembly or of the transducer MW and a corresponding outlet end 10 #, e.g., enclosed by a second connecting flange, to the aforementioned process line and to be traversed during operation by the measured substance FL. Moreover, a sealing surface may respectively be formed at each of the aforementioned connecting flanges. In the aforementioned case in which the tube assembly has at least two tubes and the two flow dividers respectively connected thereto, the inlet end 10+ of the tube assembly is correspondingly formed by means of the flow divider 21, and the outlet end 10 # of the tube assembly is correspondingly formed by means of the flow divider 22, and accordingly, the flow divider 21 can have the aforementioned first connecting flange, and the flow divider 22 can have the aforementioned second connecting flange. Moreover, the at least one tube of the tube assembly can furthermore be configured to conduct measured substance FL or a partial volume thereof in its respective lumen, i.e., for example, to carry out forced mechanical vibrations, which especially cause a measurement effect corresponding to the at least one measured variable and/or were excited by means of the exciter assembly, about an associated static resting position; this especially such that the at least one tube of the tube assembly is allowed to vibrate and is meanwhile traversed by measured substance, starting from its first tube end in the direction of its second tube end (flow direction). As is quite customary in the case of transducers of the type in question, the aforementioned forced mechanical vibrations can be at least partially forced flexural vibrations of the at least one tube about an imaginary vibration axis of the tube assembly, i.e., for example, a vibration axis imaginarily connecting the first and second tube ends.

Figure 4A:
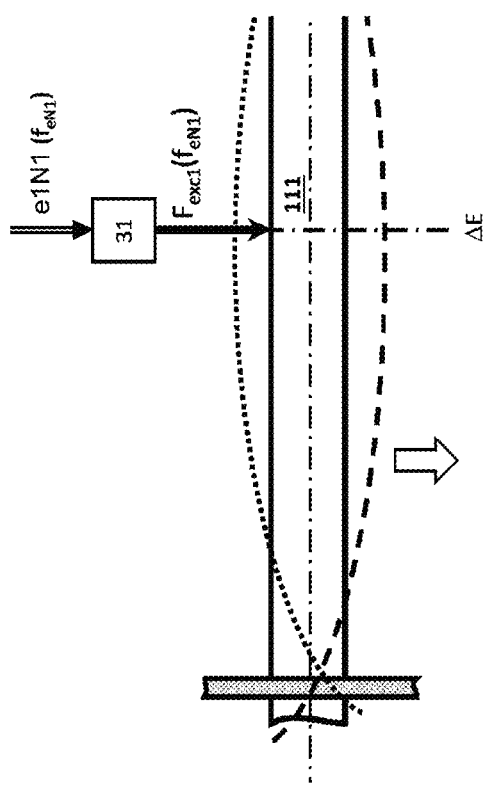
FIG. 4a shows a schematic of a tube assembly of a vibration-type transducer suitable for a vibronic measuring system according to FIG. 1, with a tube excited to vibrate to first useful vibrations.
Figure 4B:
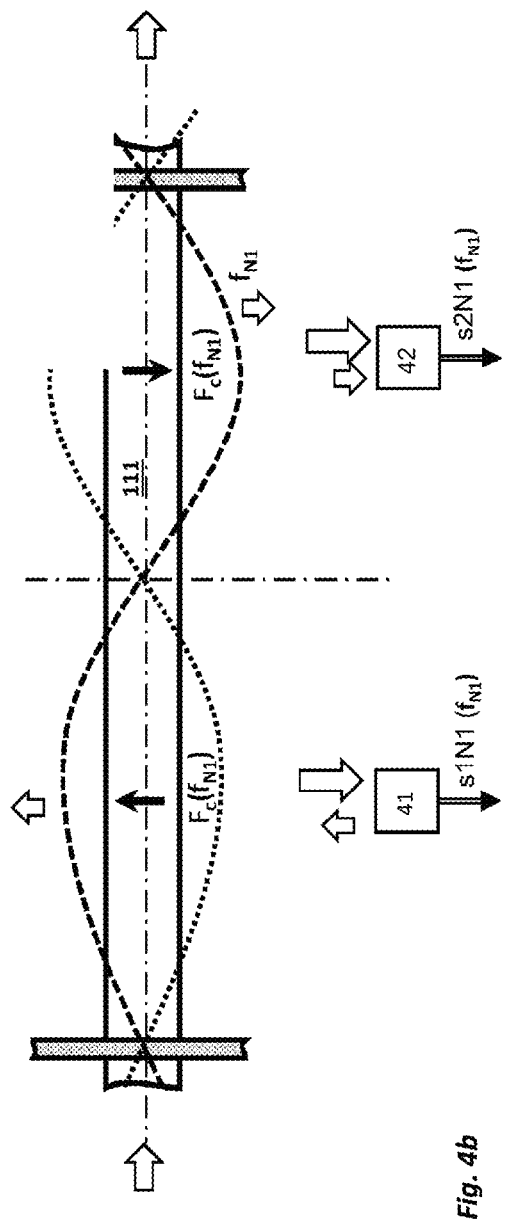
FIG. 4b shows a schematic of Coriolis vibrations of the tube, excited in a tube assembly according to FIG. 4a due to useful vibrations and dependent upon the mass flow.

The aforementioned exciter assembly of the transducer 10 in turn is especially provided or configured to convert electrical power fed thereto (from the measuring system electronics unit 20) into mechanical power in such a way that, as indicated in FIG. 4a or even readily apparent from a combination of FIGS. 2 and 4a, the at least one tube 111 of the tube assembly and/or each of the tubes thereof performs at least intermittently forced mechanical vibrations about a respective static resting position, while the sensor assembly is provided or configured to detect mechanical vibrations of the tube assembly, and not least mechanical vibrations forced by means of the exciter assembly, and/or flexural vibrations of the at least one tube and to provide a first vibration measurement signal s1 and a second vibration measurement signal s2, of which electrical, for example, vibration measurement signals s1, s2, each represent at least partially vibration movements of one or more of the tubes of the tube assembly, e.g., respectively by means of a respective variable electrical voltage corresponding to vibration movements ($X_{s1}$, $X_{s2}$) of the at least one tube; this especially such that, as shown schematically in FIG. 4b, the vibration measurement signals s1, s2 (or respectively a spectral signal component s1N1 or s2N1 thereof) follow a change in a mass flow of the measured substance conducted in the tube assembly with a change in a first phase difference (412), i.e., a change in a difference between a phase angle of the vibration measurement signal s1 and a phase angle of the vibration measurement signal s2, and/or such that each of the aforementioned vibration measurement signals s1, s2 respectively follows a change in a density of the measured substance conducted in the tube assembly with a change in a respective signal frequency of at least one spectral signal component.

The exciter assembly of the measuring system according to the invention has a vibration exciter 31, e.g., an electrodynamic vibration exciter, which is mechanically connected to the at least one tube and is moreover configured to convert electrical power with a temporally-variable electrical current into mechanical power in such a way that, as indicated in FIG. 2 or readily apparent from a combination of FIGS. 2 and 4a, a temporally-variable drive force $F_{exc1}$ acts on the tube at a drive point formed by means of said vibration exciter 31 on the tube mechanically connected thereto. In this case, an imaginary circumferential line of the tube, which passes through the aforementioned drive point encloses a cross-sectional area of the tube, which is also referred to below as the drive cross-sectional area of the tube. According to a further embodiment of the invention, the vibration exciter 31 is positioned such that, as indicated in FIG. 4a, a line of action of the aforementioned drive force $F_{exc1}$ is perpendicular to a normal of the drive cross-sectional area of the tube. According to a further embodiment of the invention, the vibration exciter 31 is of the electrodynamic type, i.e., formed by means of a vibration coil having, for example, an air coil and an armature, or the vibration exciter 31 has a magnetic armature, formed, for example, by means of a permanent magnet, and a coil flooded by the magnetic field of the armature, i.e., for example, an air coil. The magnetic armature can, for example, be mechanically connected to the at least one tube 111 to form the drive point, and/or the coil can be electrically connected to the measuring system electronics unit 20, for example.

In the aforementioned case in which the tube assembly has two tubes, the vibration exciter 31 is configured according to a further embodiment of the invention to simultaneously excite mechanical vibrations of the two tubes 111, 112; this especially such that the vibration exciter 31 acts differentially on the two tubes 111, 112, i.e., can introduce or introduces only excitation forces in opposition into the two tubes 111, 112, e.g., in such a way that the first and second tubes 111, 112 simultaneously perform opposite, forced mechanical vibrations of equal frequency. The vibration exciter 31 can accordingly be mechanically connected, for example, both to the tube 111 and to the tube 112, i.e., for example, in such a way that the aforementioned drive force acts on both the tube 111 and the tube 112. According to a further embodiment of the invention, the vibration exciter 31 is configured to provide electrical power with a temporally-variable electrical current into mechanical power such that a temporally-variable drive force acts on the second tube at a drive point formed by means of the vibration exciter 31 on the second tube mechanically connected thereto, i.e., especially simultaneously with and/or oppositely to the drive force acting on the tube 111 at the drive point formed by means of the vibration exciter 31 on the tube 111 mechanically connected thereto. According to a further embodiment of the invention, it is furthermore provided that, apart from the vibration exciter 31, the exciter assembly have no further vibration exciter connected to the tube, as is, for example, also customary in conventional vibronic (standard) measuring systems.

The sensor assembly of the measuring system according to the invention in turn has, as also schematically shown in FIG. 2, a first vibration sensor 41, especially an electrodynamic or optical, first vibration sensor, and a second vibration sensor 42, especially an electrodynamic or optical, second vibration sensor. Each of the vibration sensors 41, 42, which, for example, are also structurally identical, are respectively positioned on the tube, i.e., especially respectively mechanically connected at least partially to the tube, and are moreover configured to detect vibration movements of the at least tube and to convert them into a first or second vibration measurement signal, e.g., an electrical or optical second vibration measurement signal, representing said vibration movements; this especially such that each of the first and second vibration measurement signals respectively contains one or more sinusoidal signal components of a respective frequency corresponding to the vibration frequency of vibration movements of the tube. According to a further embodiment of the invention, it is furthermore provided that each of the vibration sensors 41, 42 be respectively positioned at a distance from the vibration exciter 31 in the flow direction, especially of more than 10 mm and/or more than one fifth of the tube length and/or at the same distance; this especially in such a way that the vibration sensors 41, 42, as also customary in conventional vibronic (standard) measuring systems, are positioned at a distance from one another in the flow direction on the tube. According to a further embodiment of the invention, each of the first and second vibration sensors 41, 42 is respectively formed by means of a plunger coil having, for example, an air coil and an armature. In the aforementioned case in which the tube assembly has at least two tubes, each of the vibration sensors 41, 42 can respectively be positioned both on the first tube 111 and on the second tube 112, i.e., especially mechanically connected both partially to the first tube and partially to the second tube, and each of the vibration sensors 41, 42 can moreover be configured to detect, especially differentially, vibration movements, i.e., especially vibration movements in opposition, both of the first tube and of the second tube and convert them into the first or second vibration measurement signal in such a way that each of the vibration measurement signals represents vibration movements, especially, vibration movements in opposition, of the first and second tubes 111, 112 (FIG. 3); this especially also in the aforementioned case in which the vibration sensors 41, 42 are respectively electrodynamic vibration sensors constructed in the manner of a plunger coil. In the aforementioned case in which the tube assembly has two tubes, each of the first and second vibration sensors is positioned, according to a further embodiment of the invention, both on the first tube and on the second tube, i.e., for example, mechanically connected both partially to the first tube and partially to the second tube. Moreover, each of the first and second vibration sensors is configured to detect vibration movements, i.e., for example, vibration movements in opposition, both of the first tube and of the second tube and convert them into the respective first or second vibration measurement signal in such a way that each of the first and second vibration measurement signals represents vibration movements of the first and second tubes. The vibration sensors can especially be designed such that vibration movements, not least also vibration movements of the tubes in opposition, can be differentially detected therewith and/or that each of the first and second vibration measurement signals respectively represents vibration movements of the first and second tubes in opposition.

Figure 5:
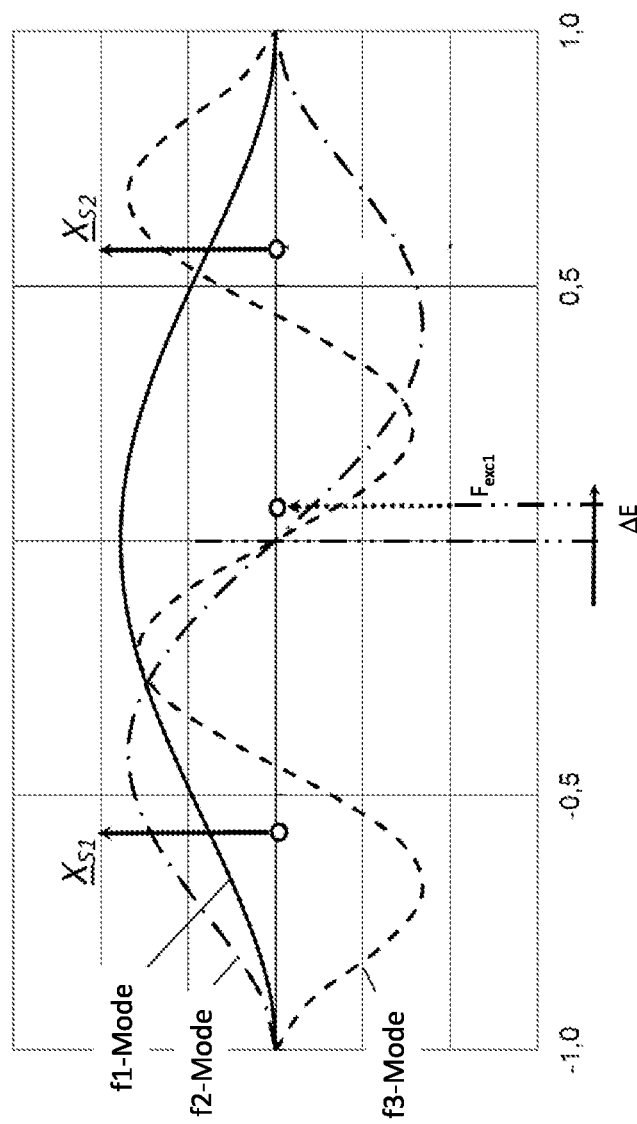
FIG. 5 shows a schematic diagram of first-order, second-order, and third-order vibration modes inherent in a tube of a tube assembly according to FIG. 4.

Inherent in the at least one tube or in each of the tubes of the tube assembly is, naturally, respectively a plurality of vibration modes (natural vibration forms) which respectively have an associated resonance frequency (f1, f2, . . . , fx) and in which the tube can perform or performs vibration movements respectively having one or more vibration antinodes (SB) and two or more vibration nodes (SK), in such a way that the number of vibration nodes in relation to the number of associated vibration antinodes is respectively greater by exactly one. Vibration movements of the respective tube in a fundamental vibration mode, i.e., a first-order vibration mode (f1 mode), i.e., for example, a first-order flexural vibration mode, have, as also indicated in FIG. 5, exactly one vibration antinode and, accordingly, two vibration nodes (f1 mode: 1SB, 2SK), while vibration movements of the respective tube in an harmonic mode (deviating from the fundamental vibration mode), i.e., a second-order or higher-order vibration mode (f2 mode, f3 mode, f4 mode, . . . fx mode), i.e., for example, a second-order, third-order, fourth-order, or higher-order flexural vibration mode, accordingly have two or more vibration antinodes and, correspondingly, three or more vibration nodes (f2 mode: 2SB, 3SK, f3 mode: 3SB, 4SK, f4 mode: 4SB, 5SK, . . . , fx mode: x·SB, [x+1]SK). In this case, each of the aforementioned vibration modes of the tube, and therefore also the first-order, second-order, or third-order vibration modes (f1 mode, f2 mode, f3 mode), has a first vibration node located in the first tube end of the at least one tube and a second vibration node located in the second tube end of the at least one tube (FIG. 5). In the aforementioned case in which the tube assembly has two (or more) tubes, a plurality of vibration modes respectively having an associated resonance frequency is correspondingly also inherent in the second tube 112, in which vibration modes the second tube (like the tube 111) can perform or performs vibration movements respectively having one or more vibration antinodes and two or more vibration nodes; this, for example, also in such a way that, in the case of a corresponding excitation, vibration movements of the tube 112 in the first-order vibration mode (f1 mode) are opposite, e.g., also in opposition, to vibration movements of the tube 111 in the first-order vibration mode thereof (f1 mode), and/or that, in the case of a corresponding excitation, vibration movements of the tube 112 in the second-order vibration mode (f2 mode) are opposite, i.e., for example, also in opposition, to vibration movements of the tube 111 in the second-order vibration mode thereof. According to a further embodiment of the invention, the tube assembly is furthermore designed such that, at least in the case of an original or intact transducer, a resonance frequency f1 of the first-order vibration mode of the tube 111 is equal to a resonance frequency of the first-order vibration mode (f1 mode) of the tube 112 and/or that, at least nominally, i.e., in the original or intact transducer, a resonance frequency f2 of the second-order vibration mode of the tube 111 is equal to a resonance frequency of the second-order vibration mode of the tube 112. In the aforementioned case in which the tube assembly has two or more tubes, and also quite customary in conventional vibronic (standard) measuring systems, the tube assembly may, moreover, further have coupling elements used to also adjust vibration properties of the tube assembly, and not least also to tune one or more resonance frequencies of the tubes thereof; this especially such that, as also indicated in FIG. 3, a first coupling element 23, e.g., a plate-shaped, first coupling element, is mechanically connected to each of the tubes and is positioned at a further distance from the flow divider 22 than from the flow divider 21, and that at least one, second coupling element 24, e.g., a plate-shaped, second coupling element and/or a second coupling element structurally identical to the coupling element 23, is mechanically connected to each of the tubes thereof and is positioned at a further distance from the flow divider 21 than from the flow divider 22.

Figure 6:
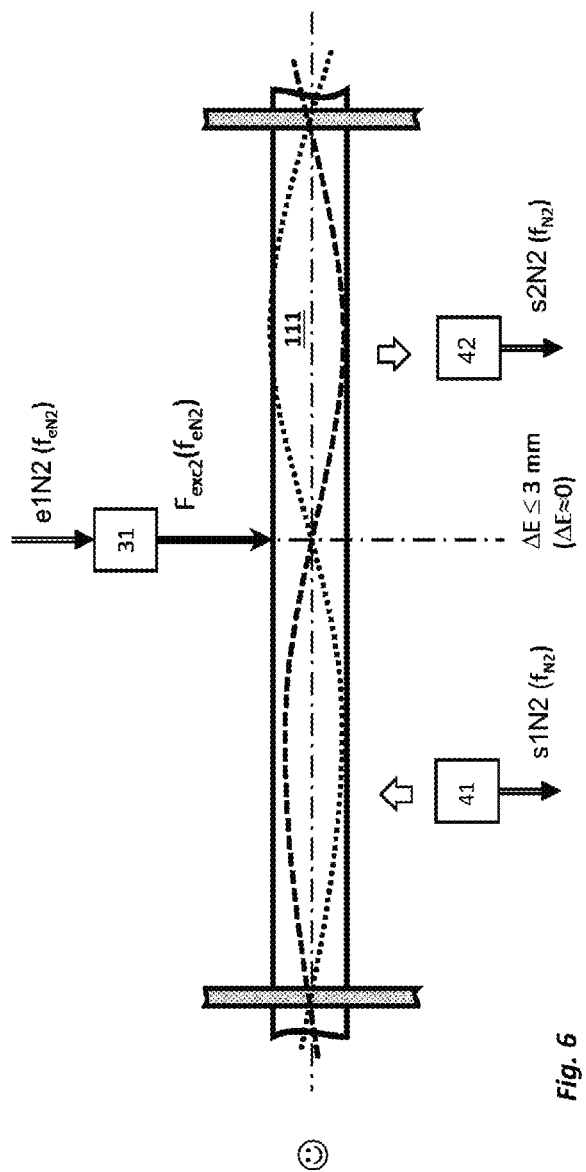
FIGS. 6 and 7 each show a schematic of the tube assembly according to FIG. 4 with tube excited to second useful vibrations.
Figure 7:
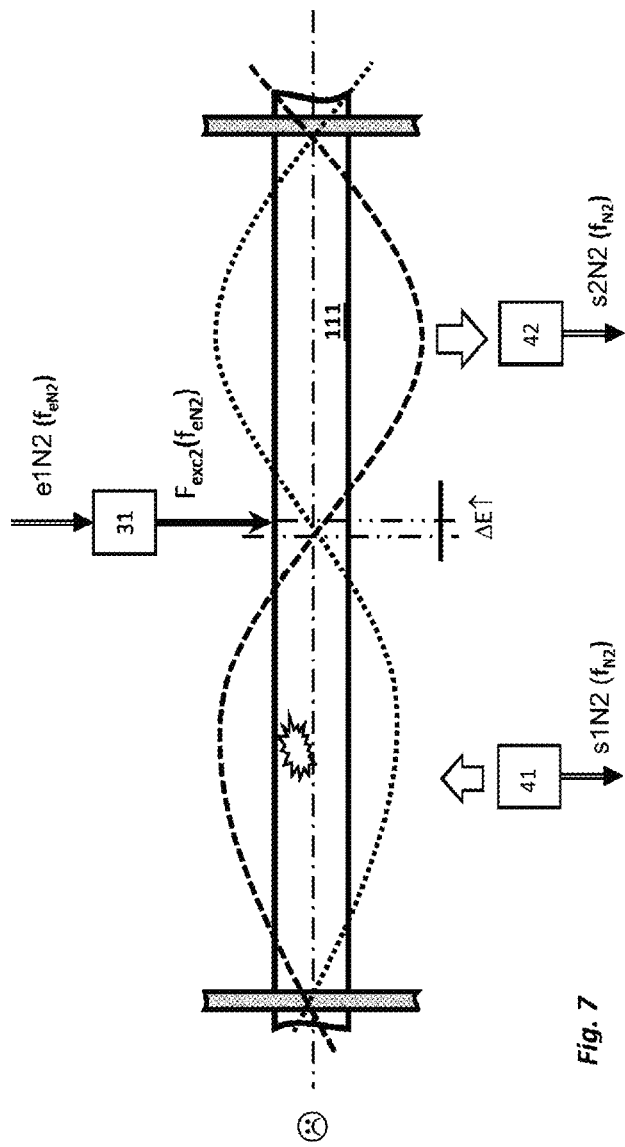

In the measuring system according to the invention, the vibration exciter 31 is positioned and aligned such that, as is also shown schematically in FIG. 4a or 6, and also quite customary in, inter alia, conventional vibronic (standard) measuring systems, a drive offset ΔE, i.e., a smallest distance between the aforementioned drive cross-sectional area of the tube 111 and a specified reference cross-sectional area of the at least one tube, is no more than 3 mm and/or less than 0.5% of the tube length, wherein the reference cross-sectional area in turn is selected or defined, i.e., for example, is determined with an intact or original transducer, such that a vibration node, which is formed between two vibration antinodes of vibration movements of the at least one tube in a harmonic mode, i.e., for example, the second-order vibration mode, and/or is (nominally) located at half the tube length, of said vibration movements is within the reference cross-sectional area. The drive offset ΔE thus virtually also corresponds to a distance between an area centroid (center point) of the drive cross-sectional area of the tube and an area centroid (center point) of the reference cross-sectional area of the at least one tube. According to a further embodiment of the invention, the reference cross-sectional area of the at least one tube is moreover selected such that a main inertia axis, perpendicular to the aforementioned drive force, of said tube and/or an intersection line of two, mutually-orthogonal symmetry planes of said tube are within the reference cross-sectional area. Moreover, the tube assembly and the exciter assembly according to a further embodiment of the invention are designed such that the drive offset ΔE, at least nominally or initially, and therefore in the intact or original transducer, and as also quite customary in, inter alia, conventional vibronic (standard) measuring systems, is only slightly greater than zero, i.e., less than 2 mm, e.g., also less than 1 mm, and/or less than 0.2%, of the tube length; in the case of ideal or completely symmetrical tube and sensor assemblies, also such that the drive offset is equal to zero (ΔE=0), and therefore the area centroid of the drive cross-sectional area of the tube corresponds to or coincides with the area centroid of the reference cross-sectional area as far as possible. In the aforementioned case in which the at least one tube is curved at least sectionally, i.e., for example, at least sectionally has the shape of a circular arc and/or is substantially V-shaped, the at least one tube 111 may furthermore also be designed, and the aforementioned reference cross-sectional area may be selected, such that exactly one main inertia axis of the at least one tube is within the reference cross-sectional area of said tube. For the other case in which the at least one tube is straight over the entire length of the tube, the aforementioned reference cross-sectional area in turn may be selected such that each of the three main inertia axes of the at least one tube is within the reference cross-sectional area of the at least one tube or that a center of mass is within the reference cross-sectional area of the at least one tube. According to a further embodiment of the invention, the reference cross-sectional area is selected such that a vibration node of said vibration movements that is formed between the two vibration antinodes of the vibration movements of the at least one tube in the aforementioned second-order vibration mode, i.e., especially the second-order flexural vibration mode, and/or a main inertia axis of the at least one tube, which is perpendicular to the vibration direction of the vibration movements of the tube in said second-order vibration mode, is within the reference cross-sectional area of the at least one tube.

As already mentioned, the measuring system comprises, in addition to the transducer 10, a measuring system electronics unit 20 electrically coupled thereto, i.e., especially both to the exciter assembly thereof and to the sensor assembly thereof. The measuring system electronics unit 20 may, for example, be designed to be programmable and/or remotely parameterizable, i.e., for example, correspondingly formed by means of at least one microprocessor and/or at least one digital signal processor (DSP) and/or by means of a programmable logic component (FPGA) and/or by means of a customer-specifically programmed logic module (ASIC). Furthermore, the measuring system electronics unit 20 can be supplied with the electrical energy required during operation by means of internal energy stores and/or from outside the measuring system electronics unit 20 via a connecting cable. The electrical coupling or connection of the transducer 10 to the measuring system electronics unit 20 may take place by means of corresponding electric connecting lines and corresponding cable feedthroughs. In this case, the connecting lines can be formed at least partially as electric conductor wires sheathed at least in some sections by electric insulation, for example in the form of "twisted pair" lines, ribbon cables, and/or coaxial cables. As an alternative or in addition thereto, the connecting lines can also be formed at least in some sections by means of printed conductors of a printed circuit board, especially a flexible, optionally varnished printed circuit board. Moreover, as also shown schematically in FIG. 1, the measuring system electronics unit 20 may, for example, be accommodated in a corresponding, separate, electronics protective housing 200, which is especially impact-resistant and/or also explosion-resistant and/or at least protects against spray water, and can moreover be designed such that, during operation of the measuring system, it can exchange measurement and/or other operating data, e.g., also status messages, such as respectively current measured values or setting and/or diagnosis values used to control the measuring system (FIGS. 2 and 3), with a superordinate electronic (measurement) data processing system (not shown here), e.g., a programmable logic controller (PLC), a process control system (PLS), a remote terminal unit (RTU), or a supervisory control and data acquisition (SCADA) process executed on a personal computer (PC) and/or a workstation, via a data transmission system—for example, a fieldbus system, and/or wirelessly via radio. Accordingly, the measuring system electronics unit 20 may, for example, have such a transmitting and receiving circuit COM, which is fed during operation by a (central) evaluation and supply unit provided in the aforementioned data processing system and remote from the measuring system. For example, the measuring system electronics unit 20 (or its aforementioned transmitting and receiving electronics COM) may moreover be designed such that it can be connected electrically to the aforementioned external electronic data processing system via a two-conductor connection 2L, optionally also configured as a 4-20 mA current loop, and, via said connection, can both obtain the electrical power required for operating the measuring system from the aforementioned evaluation and supply unit of the data processing system and transmit measured values, optionally digitized measured values, to the data processing system—for example, by (load) modulation of a direct supply current fed by the evaluation and supply unit. Moreover, the measuring system electronics unit 20 may also be designed such that it can be operated nominally at a maximum power of 1 W or less and/or is intrinsically safe. Moreover, the measuring system electronics unit 20 may, for example, also be constructed in a modular manner in such a way that various electronic components of the measuring system electronics unit 20, such as a measurement and evaluation circuit DSV formed, for example, by means of one or more microprocessors and/or by means of one or more digital signal processors, for processing and evaluating the measurement signals provided by the transducer 10, and not least the vibration measurement signals, a driver circuit Exc for controlling the transducer 10 or the exciter assembly thereof, an internal power supply circuit VS for providing one or more internal operating voltages, and/or the aforementioned transmitting and receiving circuit COM used to communicate with the aforementioned superordinate (measurement) data processing system or the aforementioned external fieldbus, are respectively arranged on one or more separate circuit boards and/or are respectively formed by means of one or more separate microprocessors. As can be respectively seen from FIGS. 2 and 3, the aforementioned transmitting and receiving circuit COM may, for example, also be provided for one of the outputs ($x_m$) of measured values ($X_M$) determined internally by the measuring system—for example, by the aforementioned measurement and control circuit DSV. Accordingly, the transmitting and receiving circuit COM may moreover be configured to convert received measured values $X_M$ into an output signal $x_m$ providing said measured value $X_M$, e.g., an output signal complying with an industry standard, i.e., for example, DIN IEC 60381-1:1985-11, IEC 61784-1 CPF1 (Foundation Fieldbus), IEC 61784-1 CPF3 (Profibus), IEC 61158, or IEC 61784-1 CPF9 (HART). In order to visualize measured values ($X_M$) generated internally by the measuring system and/or status messages generated internally by the measuring system, such as an error message or an alarm, on-site, the measuring system may furthermore have a display and operating element HMI, such as an LCD, OLED, or TFT display positioned in the aforementioned electronics housing 200 behind a window provided correspondingly therein, which HMI also communicates at least intermittently with the measuring system electronics unit 20, and a corresponding input keyboard and/or a touchscreen. In the case in which the measuring system has the aforementioned support frame 100, which is particularly designed as a transducer protective housing, the electronics protective housing 200 may, for example, be fastened to said support frame, as also shown schematically in FIGS. 1, 2, and 3 or readily apparent from the combination thereof.

In the measuring system according to the invention, the measuring system electronics unit 20 is in particular configured to energize the vibration exciter 31, i.e., to feed electrical power into the vibration exciter 31 by means of an electrical drive signal e1 having a temporally-variable electrical current, in such a way that the at least one tube performs forced mechanical vibrations, i.e., for example, flexural vibrations, at one or more vibration frequencies specified by the drive signal e1. Moreover, the measuring system electronics unit 20 is configured to at least intermittently, i.e., for example, in normal measuring operation or during a measuring interval, provide the drive signal e1 with a sinusoidal first (useful) current eN1 having a first (AC) frequency $f_{eN1}$, in such a way that the at least one tube at least partially, e.g., also predominantly, performs first useful vibrations, i.e., mechanical vibrations, forced by the vibration exciter 31 (energized with the (useful) current eN1) or a first drive force (component) $F_{exc1}$ generated therewith, at a first useful frequency $f_{N1}$, i.e., a (vibration) frequency corresponding to the first (AC) frequency $f_{eN1}$ ($f_{N1}=f_{eN1}$) and that, as a result, the vibration signal s1 has a first useful signal component s1N1, and the vibration signal s2 has a first useful signal component s2N1, i.e., respectively a sinusoidal signal component with a (signal) frequency $f_{s1N1}$ or $f_{s2N1}$ corresponding to the first useful frequency $f_{N1}$ ($f_{s1N1}=f_{s2N1}=f_{N1}$); this especially such that the first useful frequency $f_{N1}$ deviates from a resonance frequency f2 of the second-order vibration mode (f2 mode) by more than 5% of said resonance frequency f2 ($|f2-f_{N1}|>0.05$ f2) and/or by more than 10 Hz ($|f_2-f_{N1}|>10$ Hz) and/or such that the first useful vibrations are suitable for causing, in the measured substance flowing through the at least one rube or through the tube assembly formed therewith, Coriolis forces $F_c$ dependent upon the mass flow thereof. Accordingly, the measuring system electronics unit can furthermore be configured to adjust the first (useful) current eN1 of the drive signal, as is quite customary in vibronic measuring systems of the type in question, such that, due to the first useful vibrations excited therewith, Coriolis vibrations dependent upon the mass flow are also forced, and, as a result, the useful signal components s1N1; s2N1 of the vibration measurement signals s1, s2 follow a change in a mass flow of the measured substance conducted in the at least one tube with a change in a phase difference of the first useful signal components of the vibration measurement signals s1, s2, i.e., a difference between a phase angle of the first useful signal component s1N1 and a phase angle of the first useful signal component s2N1. In the aforementioned case in which the tube assembly has at least two tubes, the vibration exciter 31 may moreover also be configured correspondingly to simultaneously convert electrical power fed in by means of the electrical drive signal e1 into forced mechanical vibrations of the first and second tubes 111, 112; this especially also such that the first and second tubes 111, 112 perform forced mechanical vibrations at the first useful frequency $f_{N1}$ simultaneously, i.e., for example, vibrations in opposition. In the aforementioned case in which the vibration exciter 31 is formed by means of a coil electrically connected to the measuring system electronics unit, energizing the vibration exciter 31 means that the coil receives the drive signal e1, i.e., the current thereof.

The aforementioned (AC) frequency $f_{eN1}$ of the useful current components eN1, and therefore the first useful frequency $f_{N1}$, may for example correspond to a resonance frequency of the tube assembly, which also depends upon the density of the measured substance FL conducted in the tube assembly, i.e., for example, a lowest resonance frequency of the tube 111 or the resonance frequency f1 of the fundamental vibration mode (f1 mode). Accordingly, the measuring system electronics unit 20 according to a further embodiment of the invention is furthermore configured to adjust the first (AC) frequency $f_{eN1}$ such that said (AC) frequency few or the useful frequency $f_{N1}$ deviates from the resonance frequency f1 of the fundamental vibration mode by less than 1% of said resonance frequency f1 ($|f1-f_{N1}|<0.01$ f1) and/or by less than 1 Hz ($|f1-f_{N1}|<1$ Hz), i.e., for example, corresponds to the resonance frequency f1 of the fundamental vibration mode (f1 mode), or that the vibration movements of the first useful vibrations ultimately correspond to those of the fundamental vibration mode (f1 mode) of the at least one tube 111. According to another embodiment of the invention, the measuring system electronics unit is configured to adjust the first (AC) frequency few such that said (AC) frequency few or the useful frequency $f_{N1}$ deviates from a resonance frequency f3 of the third-order vibration mode (f3 mode) by less than 1% of said resonance frequency f3 ($|f3-f_{N1}|<0.01$ f3) and/or by less than 1 Hz ($|f3-f_{N1}|<1$ Hz), i.e., for example, corresponds to the resonance frequency f3 of the third-order vibration mode (f3 mode), or that the vibration movements of the first useful vibrations thus ultimately correspond to those of the third-order vibration mode (f3 mode) of the at least one tube 111. In order to generate the drive signal e1, the measuring system electronics unit 20, as is quite customary in such measuring systems, can have a corresponding driver circuit Exc, formed, for example, by means of one or more phase-locked loops (PLL) used to determine a respective resonance frequency or to adjust the currently required (AC) frequency.

The measuring system electronics unit 20, as already indicated, is furthermore especially also provided to receive and evaluate the vibration measurement signals s1, s2 generated by means of the transducer 10, i.e., especially to determine and output measured values $X_M$ representing the at least one measured variable. In particular, the measuring system electronics unit 20 is configured to determine, based upon at least the first useful signal components s1N1, s2N1, i.e., for example, based upon the (signal) frequency thereof, and/or based upon an amplitude of at least one of the useful signal components s1N1, s2N1 and/or based upon a phase angle of at least one of the useful signal components s1N1 or s2N1, measured values representing the at least one measured variable, i.e., for example, mass-flow measured values representing the mass flow of the measured substance and/or density measured values representing the density of the measured substance; this, for example, also in a manner typical for measuring systems of the type in question, and not least also for the measuring systems known from the above-mentioned US-A 2006/0266129, US-A 2007/0113678, US-A 2010/0011882, US-A 2012/0123705, US-A 2017/0356777, U.S. Pat. Nos. 5,602,345, 5,926,096, WO-A 2009/136943, WO-A 2019/017891, WO-A 2019/081169, WO-A 2019/081170, WO-A 87/06691, WO-A 96/05484, WO-A 96/08697, WO-A 97/26508, WO-A 99/39164, or our own, not prepublished, international patent application PCT/EP2019/082044. According to a further embodiment of the invention, the measuring system electronics unit 20 is accordingly furthermore configured to generate, based upon the aforementioned phase difference of the first useful signal components s1N1; s2N1, mass-flow measured values representing the mass flow, e.g., by means of a phase-difference-to-mass-flow-measured-value characteristic curve function programmed into the measuring system electronics unit, i.e., a characteristic curve function of the measuring system electronics unit, and optionally also designed as a (linear) parameter function, according to which a determined phase difference is therewith converted into mass-flow measured values $X_m$. According to a further embodiment of the invention, the measuring system electronics unit 20 is the measuring system electronics unit is moreover configured to determine the resonance frequency f1 of the first vibration mode (f1 mode) of the at least one tube, i.e., for example, to determine, based upon the drive signal e1 and/or on at least one of the vibration measurement signals s1, s2, frequency values $X_{f1}$ representing the resonance frequency f1; this, for example, also in order to calculate, based upon such frequency values, the density measured values $X_p$ representing the density—for example, according to a corresponding resonance-frequency-to-density-measured value characteristic curve function of the measuring system electronics unit. Alternatively or additionally, the measuring system electronics unit 20 may also be provided or configured to generate, based upon at least one vibration measurement signal s1, s2, and or upon the drive signal e1, viscosity measured values, i.e., measured values representing the viscosity of the measured substance FL—for example, according to a damping-to-viscosity-measured-value characteristic curve function of the measuring system electronics unit. The processing of the vibration measurement signals s1, s2, and possibly also a control of the aforementioned driver circuit(s) Exc, which is quite customary in such measuring systems, may also take place, as is also respectively shown schematically in FIG. 2 or 3, for example, also by means of the aforementioned measurement and evaluation circuit DSV.

The program codes executed during operation of the measuring system in the measuring system electronics unit 20, i.e., for example, in one or more of the aforementioned microprocessors or digital signal processors of the measuring system electronics unit 20, can respectively be stored persistently, for example, in one or more non-volatile data memories (EEPROM) of the measuring system electronics unit 20, i.e., memories storing digital data even without an applied operating voltage, and, when said measuring system electronics unit is started up, can be loaded into a volatile data memory (RAM) provided, e.g., integrated into the microprocessor, in the measuring system electronics unit 20 or in the aforementioned measurement and evaluation circuit DSV. For processing in the microprocessor or in the digital signal processor, the vibration measurement signals s1, s2 are of course first to be converted into corresponding digital signals by means of corresponding analog-to-digital converters (A/D), i.e., for example, by, respectively, suitably digitizing the respective signal voltage of each of the vibration measurement signals s1, s2, which are electrical here; cf. in this respect, for example, the above-mentioned U.S. Pat. No. 6,311,136. Accordingly, corresponding analog-to-digital converters for the vibration measurement signals s1, s2 and/or at least one non-volatile electronic data memory EEPROM, which is configured to store digital data, i.e., for example, even without an applied operating voltage, can be provided in the measuring system electronics unit 20, viz., for example, in the aforementioned measurement and evaluation circuit DSV. In order to further improve the accuracy with which the measured values $X_M$ are ultimately determined, the transducer can, as also respectively shown schematically in FIGS. 2 and 3 and as quite customary in such measuring systems, furthermore also have temperature sensors 71 (71, 72) used to detect temperatures within the tube assembly and to provide one or more corresponding temperature measurement signals θ1 (θ1, θ2), and respectively attached, for example, directly to the at least one tube of the tube assembly, and/or strain sensors used to detect mechanical stresses within the tube assembly and to provide one or more corresponding strain measurement signals, and respectively attached, for example, directly to one of the tubes of the tube assembly, and the measuring system electronics unit can furthermore be configured to receive and process the temperature or strain measurement signals, i.e., especially to also use them in the determination of the measured values.

As already mentioned, during operation, the measured substance or the (measured-substance) quality thereof can significantly change temporally or be subject to significant fluctuations; this, especially, also in such a way that, due to deviations of the (measured-substance) quality from a specification specified therefor, the vibration properties of the at least one tube conducting the measured substance change to an extent significantly reducing the measurement accuracy. Changes to the vibration characteristics of the at least one tube can be attributed, for example, to changes of one or more modal masses and/or dampings determined by the quality of the measured substance, i.e., a respective mass and/or damping determining the aforementioned vibration modes, or the respective distribution thereof, and result in the (natural) vibration forms of one or more of the vibration modes of the at least one tube differing significantly from the respective counterpart thereof at normal (measured-substance) quality, i.e., a quality within the specification; this regularly also in such a way that a density, typically substantially homogeneous or uniform, and viscosity of the measured substance that is present in a normal measured substance are distributed increasingly unevenly and the aforementioned (system) parameters of modal mass and modal damping of one or more of the vibration modes are correspondingly changed as a result. As a result, not only do changes in the quality of the measured substance lead to the resonance frequency of one or more of the aforementioned vibration modes changing, but such changes also regularly lead to the form of the vibration movements of the respective vibration modes being subject to changes in such a way that the position of one or more of the vibration nodes located between two vibration antinodes of the vibration movements of the at least one tube in one or more of the harmonic modes thereof, and therefore also the position of the aforementioned reference cross-sectional area relative to its respective original position and/or to the vibration nodes, is changed. Accordingly, the drive offset determined relative to the reference cross-sectional area or the vibration node also experiences changes, for example, in such a way that the drive offset in comparison to the drive offset ΔE determined in the normal measured substance increases. Examples of such fluctuations in the (measured-substance) quality or deviations of the (measured-substance) quality from the (measured-substance) specification include a temporally changing loading of the measured substance with a foreign substance, such as solid particles and/or gas bubbles in a liquid, a formation of condensate in a gaseous measured substance, an outgassing of a liquid measured substance or, in the case of a measured substance formed as a dispersion, a temporally changing concentration of individual phases and/or components of the measured substance and/or an occasional segregation of components of the measured substance.

System functions affected by such changes in the (measured-substance) quality or deviations of the (measured-substance) quality from the specification can, for example, correspond to one or more (modal) vibration responses of the tube assembly that are relevant to the measurement of the at least one measured variable, i.e., for example, a functional dependence of an amplitude of the aforementioned useful vibrations from the drive signal or a functional dependence of an amplitude of the aforementioned Coriolis vibrations from the drive signal and mass flow. Examples of such system functions of the transducer can accordingly, for example, include a mass-flow-to-phase-difference system function, i.e., a system function of the transducer according to which the aforementioned phase difference of the first useful signal components of the vibration measurement signals depends upon the mass flow, one or more resonance frequencies of the tube assembly as system functions containing (system) parameters, such as a density-to-resonance-frequency system function, i.e., for example, a system function of the transducer according to which the aforementioned resonance frequency f1 depends upon the density, or dampings of vibrations as system functions containing (system) parameters, such as a viscosity-to-damping function, i.e., for example, a system function of the transducer according to which a damping of the first useful vibrations depends upon the viscosity. Accordingly, however, one or more measurement functions of the measuring system can also be affected, according to which function the measuring system ultimately converts the measured variable to be detected in each case into the respective measured values which are based upon one or more of the aforementioned system functions of the transducer. Examples of such measurement functions of the measuring system include, inter alia, a mass-flow-to-measured-value function involving the mass-flow-to-phase-difference system function and the aforementioned phase-difference-to-mass-flow-measured-value characteristic curve function of the measuring system electronics unit, i.e., a measurement function of the measuring system according to which mass-flow measured values determined thereby depend upon the mass flow, and/or a density-to-measured-value function of the measuring system involving the aforementioned density-to-resonance-frequency system function of the transducer and the aforementioned resonance-frequency-to-density-measured-value characteristic curve function of the measuring system electronics unit, and/or also a viscosity-to-measured-value characteristic curve function of the measuring system involving the aforementioned viscosity-to-damping system function of the transducer and the aforementioned damping-to-viscosity-measured-value characteristic curve function of the measuring system electronics unit. The changes in the (measured-substance) quality or deviations of the (measured-substance) quality from the specification in question can, especially, also lead to one or more system functions or (system) parameters characterizing a corresponding measurement function, for example, a (scale) zero point and/or a sensitivity (slope of the characteristic curve function) of the aforementioned phase-difference-to-mass-flow-measured-value characteristic curve function, which corresponds to a change in the phase difference of the first useful signal component related to a change in the mass flow, being subject to corresponding temporal changes, i.e., for example, having corresponding fluctuations, and to a measurement accuracy of the measuring system, with which the latter ultimately represents the measured variable to be detected, in the corresponding measured values, being significantly reduced as a result in relation to a measurement accuracy of the measuring system in the case of the normal measured substance.

In order to be able to detect and possibly report any changes in the quality of the measured substance or the deviation thereof from the specification as early and reliably as possible, it is therefore furthermore provided to actively excite the tube assembly to mechanically vibrate by means of the exciter assembly in such a way that the at least one tube performs vibrations which correspond to the aforementioned second-order vibration mode (f2 mode), and to correspondingly evaluate the resulting vibration measurement signals by means of the measuring system electronics unit 20, i.e., especially, to examine them for an impermissible change in the quality of the measured substance; this especially such that said vibrations corresponding to the second-order vibration mode (f2 mode) are non-volatile or stationary, i.e., have a (substantially) constant, non-zero vibration amplitude for two or more vibration periods and/or a period of more than 10 ms (milliseconds). For this purpose, the measuring system electronics unit 20 of the measuring system according to the invention is furthermore configured to at least intermittently provide the drive signal e1 with a sinusoidal second (useful) current eN2 having a second (AC) frequency $f_{eN2}$ deviating from the first (AC) frequency $f_{eN1}$ by, for example, more than 10 Hz, in such a way that the at least one tube 111 at least partially performs second useful vibrations (different from the first useful vibrations), i.e., mechanical vibrations forced by the vibration exciter 31 (energized with the (useful) current eN2) or a vibration exciter 31 energized by a second drive force (component) $F_{exc2}$ generated therewith, at a second useful frequency $f_{N2}$, i.e., a (vibration) frequency corresponding to the second (AC) frequency $f_{eN2}$ ($f_{N2}=f_{eN2}$), whereby each of the first and second vibration signals Si, s2 respectively has a second useful signal component s1N2 or s2N2, i.e., a sinusoidal signal component with a (signal) frequency $f_{s1N2}$ or $f_{s2N2}$ ($f_{s1N2}=f_{s2N2}=f_{N2}$) corresponding to the second useful frequency $f_{N2}$. According to a further embodiment of the invention, the measuring system electronics unit 20 is furthermore configured to provide the aforementioned second (useful) current (eN2) with a specified (current) amplitude.

In the measuring system according to the invention, the measuring system electronics unit 20 is moreover especially configured to adjust the second (AC) frequency $f_{eN2}$ such that it deviates from a resonance frequency f2 of the second-order vibration mode (f2 mode) of the at least one tube 111 by less than 1% ($|f2-f_{N2}|<0.01$ f2), e.g., also by less than 0.1%, of said resonance frequency f2, and/or by less than 1 Hz ($|f1-f_{N2}|<1$ Hz), e.g., also by less than 0.1 Hz; this especially also such that (AC) frequency $f_{eN2}$ corresponds to the resonance frequency f2 of the second-order vibration mode (f2 mode) ($f_{eN2}=f2$).

For the aforementioned case that the tube assembly has at least two tubes, the vibration exciter can moreover also be configured to convert electrical power fed in by means of the electrical drive signal e1 into forced mechanical vibrations of the first and second tubes 111, 112 in such a way that the first and second tubes 111, 112 simultaneously perform forced mechanical vibrations at the second useful frequency, i.e., for example, forced mechanical vibrations at the first useful frequency $f_{N1}$ and at the second useful frequency $f_{N2}$. Accordingly, the measuring system electronics unit 20 according to a further embodiment of the invention is furthermore also configured to provide the second useful current e1N2 of the drive signal e1 at least intermittently also simultaneously with the first (useful) current e1N1; this, for example, also in such a way that the (current) amplitude of the first (useful) current e1N1 is adjusted to not be smaller than the (current) amplitude of the second (useful) current e1N2 and/or that the (current) amplitude of the second (useful) current e1N2 is adjusted to more than 40%, e.g., not less than 50%, of the (current) amplitude of the first (useful) current e1N1.

Alternatively or additionally, the measuring system electronics unit is furthermore configured to adjust the second (AC) frequency $f_{eN2}$ as a function of the first (AC) frequency $f_{eN1}$ or as a function of the resonance frequency f1; this, for example, in such a way that the second (AC) frequency $f_{eN2}$ is within a frequency setting interval, of which an upper interval limit and/or a lower interval limit and/or a center frequency corresponds to a specified multiple of the first (AC) frequency $f_{eN1}$, i.e., for example, a multiple of the first (AC) frequency $f_{eN1}$ corresponding to more than 230% of the first (AC) frequency $f_{eN1}$ and/or less than 300% of the first (AC) frequency $f_{eN1}$. According to a further embodiment of the invention, the measuring system electronics unit furthermore has a first phase-locked loop (PLL1), e.g., also a digital first phase-locked loop, used to adjust the (AC) frequency $f_{eN1}$, and a second phase-locked loop (PLL2), e.g., a digital second phase-locked loop, used to adjust the (AC) frequency $f_{eN2}$. Moreover, the measuring system electronics unit 20 can furthermore be configured to adjust a capture range of the second phase-locked loop PLL2 based upon the first (AC) frequency $f_{eN1}$ or by means of at least one output signal of the first phase-locked loop PLL1, i.e., for example, an output signal of a loop filter of the first phase-locked loop PLL1.

The measuring system electronics unit 20 of the measuring system according to the invention is also configured, based upon or by evaluating at least one of the second useful signal components s1N2, s2N2, for example based upon the (signal) frequency thereof and/or based upon a (signal) amplitude of at least one of the second useful signal components s1N2, s2N2 and/or based upon a phase angle of at least one of the second useful signal components s1N2, s2N2, to monitor the quality of the measured substance, i.e., for example, to determine whether and/or to what extent a fault of measured substance is present. According to a further embodiment of the invention, the measuring system electronics unit 20 is configured, based upon the at least one of the second useful signal components s1N2, s2N2, to determine whether and/or to what extent a fault of the measured substance influencing vibration characteristics of the second-order vibration mode, i.e., an undesired change of one or more substance parameters of the measured substance, is present, i.e., for example, to determine whether a fault of the measured substance as a result of an (undesired) segregation of the measured substance and/or as a result of an (undesired) loading of the measured substance by one or more foreign substances. In addition, the measuring system electronics unit 20 may also be configured, based upon the at least one of the second useful signal components s1N2, s2N2, to determine whether and/or to what extent, due to a fault of the measured substance, a fault of one or more of the aforementioned system functions or measurement functions of the measuring system, and therefore a measurement error in the determination of the corresponding measured values, is also present.

The aforementioned evaluation of at least one of the second useful signal components s1N2, s2N2 can, for example, be a simple examination of at least one of the vibration measurement signals s1, s2 for the second useful signal component or a detection of said second useful signal component in the vibration measurement signals s1, s2 above a specified (minimum) signal level; it may, however, also comprise a dedicated measurement of the respective (signal) amplitudes or temporal amplitude profiles and/or of the respective phase angles or temporal phase angle profiles and/or of the respective (signal) frequency or temporal frequency profiles of one or more of the second useful signal components s1N2, s2N2. For example, parameter values which respectively characterize the respective vibration response or one or more of the aforementioned system functions can be determined recurrently by means of the measuring system electronics unit based upon the vibration measurement signals s1, s2 and can be compared to reference values correspondingly specified therefor. Alternatively or additionally, one or more characteristic number values for at least one measured-substance characteristic number can be recurrently calculated by means of the measuring system electronics unit based upon the vibration measurement signals s1, s2, which characteristic number values characterize a state of the measured substance, for example, in such a way that a respective characteristic number value respectively corresponds to a relationship of two or more of the aforementioned parameter values or respectively depends upon several such parameter values and/or that the measured-substance characteristic number decreases with decreasing (measured-substance) quality.

Vibration responses or (system) parameters characterizing system functions can, for example, be (vibration) amplitude ratios or (vibration) frequency ratios, flexural stiffnesses, ratios of modal flexural stiffnesses, dampings, or ratios of modal dampings of the at least one tube. The corresponding reference values for the parameter values as well as the respectively corresponding threshold values can be determined in advance, i.e., for example, in the course of a (first) calibration of the measuring system by the manufacturer at the factory or possibly also in the course of a start-up of the measuring system on-site, by means of the measuring system itself and/or based upon laboratory measurements with structurally identical measuring systems or measuring systems of the same type, based upon different measured substance of a respectively known measured-substance quality, and can accordingly be stored in advance in the measuring system electronics unit 20, for example, in the non-volatile data memory EEPROM thereof. The parameter values respectively determined with the measuring system electronics unit 20 can furthermore also be output, e.g., displayed on-site, and/or passed to the aforementioned (measurement) data processing system.

Taking into account the respectively adjusted first and second useful frequencies, a corresponding resonance frequency ratio of the respective vibration modes can, for example, also be determined and be used for monitoring the quality of the measured substance as a (system) parameter specifying system functions of the transducer, for example, in such a way that a temporally-changing, for example, continuously increasing or continuously decreasing, ratio of the resonance frequency f2 to the resonance frequency f1 is used as an indicator of the presence of a fault of the transducer. According to a further embodiment of the invention, the measuring system electronics unit 20 is accordingly configured to determine the resonance frequency f2 of the second vibration mode (f2 mode) of the at least one tube 111, i.e., for example, based upon the drive signal e1 and/or frequency values $X_{f2}$ representing the resonance frequency f2 of at least one of the vibration measurement signals s1, s2, and/or to determine a resonance frequency ratio f1/f2 corresponding to a ratio of the resonance frequency f1 of the first vibration mode (f1 mode) and the resonance frequency f2 of the second vibration mode (f2 mode), i.e., for example, to determine, based upon the first and second (AC) frequencies $f_{eN1}$, $f_{eN2}$ of the drive signal e1 and/or based upon the signal frequencies $f_{s1N1}$, $f_{s2N1}$, $f_{s1N2}$, $f_{s2N2}$ of the useful signal components s1N1, s1N2, s2N1, s2N2 of at least one of the vibration measurement signals, frequency ratio values $X_{f12}$ ($X_{f12}=f_{eN1}/f_{eN2}$; $X_{f12}=f_{s1N1}/f_{s1N2}$; $X_{f12}=f_{s2N1}/f_{s2N2}$) representing the resonance frequency ratio f1/f2. For carrying out the monitoring of the quality of the measured substance by means of the measuring system electronics unit 20, the recurrently determined frequency ratio values $X_{f12}$ can furthermore, for example, be compared to a reference value specified therefor, i.e., especially, in order to determine whether or to what extent the resonance frequency ratio f1/f2 deviates from said reference value.

Taking into account the deflections of the second useful vibrations, a change in the natural vibration form of the second-order vibration mode can furthermore, for example, also be determined and be used for the monitoring of the quality of the measured substance as a (system) parameter specifying system functions of the transducer. According to a further embodiment of the invention, the measuring system electronics unit 20 is therefore furthermore configured to determine, based upon the vibration measurement signals s1, s2, phase difference values representing at least one phase difference of the second useful signal components, i.e., a difference between a phase angle of the second useful signal component s1N2 of the vibration measurement signal s1 and a phase angle of the second useful signal component s2N2 of the vibration measurement signal s2. For carrying out the monitoring of the quality of the measured substance by means of the measuring system electronics unit 20, the recurrently determined phase difference values can, for example, furthermore be compared to one or more reference values specified therefor, for example, in order to determine whether or to what extent the phase difference of the second useful signal components or an underlying modal deflection of the second useful vibrations of the at least one tube deviates from the respective reference value. For example, an excessively high and/or temporally continuously increasing phase difference of the second useful signal component can be used as an indicator of the presence of a fault. One or more of the aforementioned reference values for the phase difference of the second useful signal component can, for example, also be set as a function of a phase difference, which is currently already determined for the determination of the mass-flow measured values $X_m$, of the first useful vibrations. Alternatively or additionally, the phase difference values determined for the second useful vibrations can also be used for carrying out the monitoring of the quality of the measured substance by means of the measuring system electronics unit 20, in order to determine a phase difference ratio corresponding to a ratio of the aforementioned phase difference of the second useful vibrations and the phase difference, which is used for the determination of the mass-flow measured values $X_m$, of the first useful vibrations. According to another embodiment of the invention, the measuring system electronics unit 20 is furthermore configured to determine, based upon the vibration measurement signals s1, s2, at least one of the (signal) amplitudes of the first useful signal components s1N1, s2N1, and therefore amplitude values respectively representing deflections x1 of the first useful vibrations, i.e., especially, both amplitude values $X_{s1N1}$ representing the (signal) amplitudes of the useful signal components s1N1 and amplitude values $X_{s2N1}$ representing the (signal) amplitudes of the useful signal components s2N1, and/or the measuring system electronics unit 20 is configured to determine at least one of the (signal) amplitudes of the second useful signal components s1N2, s2N2, and therefore amplitude values respectively representing deflections x2 of the second useful vibrations, i.e., especially, both amplitude values $X_{s1N2}$ representing the (signal) amplitudes of the useful signal components s1N2 and amplitude values $X_{s2N2}$ representing the (signal) amplitudes of the useful signal components s2N2, for example, by forming a respective moving average for the (signal) amplitudes of the useful signal components s1N1, s1N2, s1N2 or s2N2 by means of FIR filter and/or by numerical integration of the amplitude values $X_{s1N1}$, $X_{s2N1}$, $X_{s1N2}$, or $X_{s2N2}$. Alternatively or additionally, the measuring system electronics unit is furthermore configured to determine a deflection ratio x1/x2 corresponding to a ratio of the (modal) deflection of the first useful vibrations and the (modal) deflection of the second useful vibrations, i.e., for example, to determine, based upon at least one of the vibration measurement signals s1, s2, deflection ratio values representing the deflection ratio x1/x2, possibly by using the aforementioned deflection values $X_{s1N1}$, $X_{s1N2}$ and/or the aforementioned deflection values $X_{s2N1}$, $X_{s2N2}$. For carrying out the monitoring of the quality of the measured substance by means of the measuring system electronics unit 20, the recurrently determined amplitude values, i.e., especially the amplitude values $X_{s1N2}$, $X_{s2N2}$, and/or the correspondingly determined deflection ratio values, can, for example, furthermore be compared to one or more reference values specified therefor, for example, in order to determine whether or to what extent one and/or more of the (signal) amplitudes or one or more of the modal deflections of the vibrations of the at least one tube, i.e., especially, the deflections of the second useful vibrations, deviate from the respective reference value. One or more of the aforementioned reference values for the amplitude values $X_{s1N2}$, $X_{s2N2}$ (or the modal deflections of the vibrations of the at least one tube) can, for example, also be set as a function of a instantaneously adjusted (current) amplitude of the second (useful) current eN2 and/or of one of the instantaneous deflection values $X_{s1N1}$ and/or $X_{s2N1}$.

Taking into account both the deflection velocities of the first or second useful vibrations and the drive force which respectively causes them, it is moreover, for example, also possible to determine a (modal) damping of the respective useful vibrations or the corresponding vibration mode and to use it for the monitoring of the quality of the measured substance as a (system) parameter specifying system functions of the transducer, for example, in such a way that an excessively high and/or temporally continuously increasing (modal) damping of the second useful vibrations or a temporally-changing, e.g., continuously increasing or continuously decreasing, ratio of a (modal) damping d2 of the second useful vibrations to a (modal) damping d1 of the first useful vibrations is used as an indicator of the presence of a fault of the measured substance, i.e., for example, an excessively high deviation of the quality of the measured substance from the specification and/or an excessively rapid change of the (measured-substance) quality. Additionally, taking into account both the deflections of the first or second useful vibrations and also the drive force which respectively causes them, it is moreover, for example, also possible to determine a corresponding (modal) spring stiffness of the respective useful vibrations or the respectively corresponding vibration mode and to use if for monitoring the quality of the measured substance as a (system) parameter specifying system functions of the transducer, for example, in such a way that a temporally-changing and/or an excessively high (modal) damping of the second useful vibrations in the case of a simultaneously sufficiently high and temporally-constant (modal) spring stiffness of the second useful vibrations indicates the presence of a fault of the measured substance and/or that an excessively low and/or continuously decreasing (modal) spring stiffness of the second useful vibrations or a temporally-changing, for example continuously increasing or continuously decreasing, ratio of a (modal) spring stiffness c2 of the second useful vibrations to a (modal) spring stiffness c1 of the first useful vibrations, possibly also in the case of an excessively high (modal) damping of the second useful vibrations, indicates the presence of a mechanical fault of the tube assembly or of the transducer formed therewith.

According to a further embodiment of the invention, the measuring system electronics unit 20 is furthermore configured to determine a (modal) damping of the second useful vibrations corresponding to a ratio of the (signal) amplitude of one of the second useful signal components s1N2, e.g., also a sum or a difference of the (signal) amplitudes of the second useful signal components, and a (signal) amplitude of the second (useful) current eN2, i.e., for example, to determine, based upon the second (useful) current e1N2 and a second useful signal component of at least one of the vibration measurement signals s1, s2, damping values representing the damping d2 of the second useful vibrations. For carrying out the monitoring of the quality of the measured substance by means of the measuring system electronics unit 20, the recurrently determined damping values can furthermore, for example, be compared to one or more reference values specified therefor, i.e., especially, in order to determine whether or to what extent the damping of the second useful vibrations of the at least one tube deviates from a reference value (damping reference value) specified therefor. Alternatively or additionally, the measuring system electronics unit can furthermore also be configured to determine a damping ratio d1/d2 corresponding to a ratio of the (modal) damping of the first useful vibrations and the (modal) damping d2 of the second useful vibrations, i.e., for example, to determine, based upon the first and second (useful) currents of the drive signal and/or at least the first and second useful signal components of at least one of the vibration measurement signals, damping ratio values representing the damping ratio d1/d2. Accordingly, the measuring system electronics unit 20 is furthermore also configured to determine both the aforementioned (modal) damping of the second useful vibrations and a (modal) damping of the first useful vibrations corresponding to a ratio of the (signal) amplitude of one of the first useful signal components s1N1, e.g., also a sum or a difference of the (signal) amplitudes of the first useful signal components s1N1, s2N1, and a (signal) amplitude of the first (useful) current eN1, i.e., for example, to determine, based upon the drive signal and at least one of the vibration measurement signals, damping values representing the damping of the first useful vibrations. For carrying out the monitoring of the quality of the measured substance, the measuring system electronics unit 20 according to a further embodiment of the invention is furthermore configured to compare one or more of the aforementioned damping values representing the damping of the second useful vibrations and/or one or more of the aforementioned damping ratio values to at least one reference value determined therefor in advance and/or by means of an intact measuring system, i.e., for example, also to output, in the case of a deviation of one or more of the damping values from the respective reference value (damping reference value) or in the case of a deviation of one or more of the damping ratio values from the respective reference value (damping ratio reference value), a message representing this, especially, a message declared as a (fault) alarm for a reduced (measured-substance) quality. According to a further embodiment of the invention, the measuring system electronics unit 20 is furthermore configured to determine, based upon the second (useful) current e1N2 and a second signal component of at least one of the vibration measurement signals s1, s2, spring stiffness values representing the spring stiffness c2 of the second useful vibrations. Alternatively or additionally, the measuring system electronics unit can furthermore also be configured to determine a spring stiffness ratio c1/c2 corresponding to a ratio of the (modal) spring stiffness c1 of the first useful vibrations and the (modal) spring stiffness c2 of the second useful vibrations, i.e., for example, to determine, based upon the first and second (useful) currents and/or the first and second useful signal components of at least one of the vibration measurement signals, spring stiffness ratio values representing the spring stiffness ratio c1/c2. Accordingly, the measuring system electronics unit 20 is furthermore also configured to determine both the aforementioned (modal) spring stiffness c1 of the second useful vibrations and a (modal) spring stiffness of the first useful vibrations corresponding to a ratio of the (signal) amplitude of one of the first useful signal components s1N1, e.g., also a sum or a difference of the (signal) amplitudes of the first useful signal components s1N1, s2N1, and a (signal) amplitude of the first (useful) current eN1, i.e., for example, to determine, based upon the first (useful) current e1N1 and the first useful signal components of at least one of the vibration measurement signals, spring stiffness values representing the spring stiffness c1 of the first useful vibrations. For carrying out the monitoring of the quality of the measured substance by means of the measuring system electronics unit 20, the recurrently determined spring stiffness values or spring stiffness ratio values can furthermore, for example, be compared to one or more reference values specified therefor, i.e., for example, in order to determine whether or to what extent the spring stiffness c2 of the second useful vibrations of the at least one tube deviates from a reference value (spring stiffness reference value) specified therefor. In a further embodiment of the invention, the measuring system electronics 20 is furthermore configured for the case that, based upon the comparison to the reference value, an excessively low and/or temporally continuously decreasing (modal) spring stiffness of the second useful vibrations or a temporally-changing, for example continuously increasing or continuously decreasing, ratio of a (modal) spring stiffness c2 of the second useful vibrations to a (modal) spring stiffness c1 of the first useful vibrations is determined, to output a message indicating a damaged measuring system, for example, also a message declared as a (fault) alarm for the measuring system, i.e., especially, also no (fault) alarm for a reduced (measured substance) quality.

The parameter values determined for one or more of the aforementioned (system) parameters, i.e., for example, the resonance frequency ratio f1/f2 of the at least one tube, the deflection ratio x1/x2 of the first and second useful vibrations, the (modal) damping d2 of the second useful vibrations, the damping ratio d1/d2 of the first and second useful vibrations, the (modal) spring stiffness d2 of the second useful vibrations, the spring stiffness ratio c1/c2 of the first and second useful vibrations, etc., i.e., for example, spring stiffness values representing the (modal) spring stiffness c2, spring stiffness ratio values representing the spring stiffness ratio c1/c2, damping values representing the (modal) damping d2, damping ratio values representing the damping ratio d1/d2, deflection ratio values representing the deflection ratio x1/x2, phase difference values representing the phase difference of the second useful signal components, etc., can furthermore also be used for recurrently determining a scatter measure of the respective system parameter. Such a scatter measure can, for example, be an empirical variance or a span for the respective (system) parameter or the parameter values respectively determined therefor. The determined scatter measure can likewise be used for the monitoring of the quality of the measured substance, for example, in such a way that a fault of the measuring system is at most inferred if the respective (system) parameter has a low scatter measure, i.e., a scatter measure below a correspondingly specified threshold value, and/or that a (system) parameter having a scatter measure above a correspondingly specified threshold value does not trigger any fault message, even if a comparison of its parameter values to the respective reference value would initially indicate this. Alternatively or additionally, the scatter measure determined respectively with the measuring system electronics unit 20 can also be output, e.g., displayed on-site, and/or passed to the aforementioned (measurement) data processing system. Alternatively or additionally, the parameter values determined for one or more of the aforementioned (system) parameters, i.e., for example, the resonance frequency ratio f1/f2 of the at least one tube, the deflection ratio x1/x2 of the first and second useful vibrations, the damping of the second useful vibrations, the damping ratio d1/d2 of the first and second useful vibrations, etc., can furthermore also be used for the recurrent determination of a temporal change, i.e., for example, a change trend and/or a rate of change and/or a change rate and/or a change velocity of the respective (system) parameter. The determined temporal change can likewise be used for the monitoring of the quality of the measured substance, for example, in such a way that, in the case of increasing damping of the second useful vibrations or in the case of a change in the resonance frequency ratio f1/f2 and/or damping ratio d1/d2 increasing with a change rate outside a specified measuring range, an increasing deviation of the quality of the measured substance is detected and possibly correspondingly reported. The temporal change or change rate or change velocity respectively determined with the measuring system electronics unit 20 can moreover also be output, e.g., displayed on-site, and/or passed to the aforementioned (measurement) data processing system.

The monitoring according to the invention of the quality of the measured substance can, for example, be carried out during a test interval correspondingly reserved for this purpose, for example, also an occasionally repeated test interval or a test interval respectively lasting for not less than 1 s (second). The test interval can be time-limited, e.g., to respectively less than 1 min, be started nevertheless recurrently, e.g., by a command from outside the measuring system and/or in an automated manner, i.e., in a time-controlled and/or event-controlled manner by the measuring system electronics unit itself. Accordingly, the measuring system electronics unit according to a further embodiment of the invention is to automatically start and/or end the test interval and/or is to be able to receive and execute one or more commands that start the test interval. According to a further embodiment of the invention, the measuring system electronics unit is furthermore configured to start the test interval during the normal measuring operation or during the excitation of the first useful vibrations in such a way that at least the drive signal e1 with the second (useful) current e2 is provided; this, for example, also in such a way that the drive signal e1 simultaneously also contains, at least intermittently, the first (useful) current eN1, so that the second useful vibrations are simultaneously excited with the first useful vibrations, and the first and second useful vibrations are therefore at least intermittently superposed on one another during the test interval. According to a further embodiment of the invention, the measuring system electronics unit is moreover configured to determine during the test interval, based upon the second useful signal components s1N2; s2N2, and especially based upon their (signal) frequency and/or based upon a (signal) amplitude of at least one of the second useful signal components s1N2 and/or based upon a phase angle of at least one of the second useful signal component s1N2, measured values representing the at least one measured variable.

The invention claimed is:

1. A vibronic measuring system, including a Coriolis mass flow measuring device or Coriolis mass flow/density measuring device, for measuring and/or monitoring at least one measured variable, including at least one of a mass flow, a volumetric flow, and a flow rate, and/or a substance parameter, including a density and/or a viscosity, of a fluid measured substance, including a gas, a liquid, or a dispersion, which measuring system, which is configured as an in-line measuring device and/or a measuring device of compact design, the measuring system comprising:

a transducer including a tube assembly configured to conduct the measured substance flowing therethrough, an exciter assembly configured to convert electrical power into mechanical power suitable to excite and maintain forced mechanical vibrations of the tube assembly, and a sensor assembly configured to detect mechanical vibrations of the tube assembly and to generate vibration measurement signals respectively representing vibration movements of the tube assembly; and an electronics unit, which is electrically coupled to both the exciter assembly and the sensor assembly by electrical connecting lines, the electronics unit, including at least one microprocessor, configured to control the transducer and to evaluate the vibration measurement signals generated by the transducer, wherein the tube assembly includes at least one tube, which is at least sectionally curved and/or at least sectionally straight and which includes a first tube, wherein the first tube extends from a first first tube end to a second first tube end with a tube length of more than 100 mm, and includes a lumen enclosed by a first tube wall, which extends from the first first tube end to the second first tube end, wherein the first tube of the at least one tube is configured to be traversed by the measured substance at least in a flow direction from the first first tube end to the second first tube end while being allowed to vibrate, and wherein, inherent in the at least one tube, is a plurality of vibration modes, which are natural vibration forms, respectively having an associated resonance frequency, in which vibration modes the at least one tube can perform or performs vibration movements respectively having one or more vibration antinodes and two or more vibration nodes, such that:

vibration movements of the at least one tube in a fundamental vibration mode, which is a first-order vibration mode, include exactly one vibration antinode and two vibration nodes; and vibration movements of the at least one tube in a harmonic mode, which is a second-order or higher-order vibration mode, include two or more vibration antinodes and three or more vibration nodes, wherein the exciter assembly includes an electrodynamic vibration exciter mechanically connected to the at least one tube and configured to convert electrical power with a temporally variable electrical current into mechanical power such that, at a drive point formed by the vibration exciter on the at least one tube mechanically connected thereto, a temporally variable drive force acts on the at least one tube such that a line of action of the drive force is perpendicular to a normal of a drive cross-sectional area of the at least one tube, wherein the vibration exciter is positioned and aligned such that a drive offset, which is a smallest distance between the drive cross-sectional area of the at least one tube enclosed by an imaginary circumferential line of the at least one tube passing through the drive point and a specified reference cross-sectional area of the at least one tube, which is determined using an intact or new transducer, is not more than 3 mm and/or less than 0.5% of the tube length, wherein a vibration node formed between two vibration antinodes of the vibration movements of the at least one tube in a second-order or higher-order vibration mode deviating from the first-order vibration mode and nominally located at half the tube length, is within the reference cross-sectional area, and wherein the drive offset of the intact or new transducer is substantially zero, wherein the electronics unit is configured to energize the vibration exciter with electrical power via an electrical drive signal having a temporally variable electrical current such that the at least one tube performs forced mechanical vibrations at one or more vibration frequencies specified by the drive signal, wherein the sensor assembly includes an electrodynamic or optical first vibration sensor, which is positioned on and at least partially mechanically connected to the first tube at a distance from the vibration exciter in the flow direction of more than 10 mm and/or more than one fifth of the tube length, the first vibration sensor configured to detect vibration movements of the first tube and convert said vibration movements into an electrical or optical first vibration measurement signal representing said vibration movements such that the first vibration measurement signal contains one or more sinusoidal signal components respectively having a frequency corresponding to a vibration frequency of vibration movements of the first tube, wherein the sensor assembly includes at least one electrodynamic or optical second vibration sensor, which is positioned on and at least partially mechanically connected to the first tube at a distance from the vibration exciter in the flow direction of more than 10 mm and/or more than one fifth of the tube length and/or at a distance from the first vibration sensor in the flow direction, the second vibration sensor configured to detect vibration movements of the first tube and convert said vibration movements into an electrical or optical second vibration measurement signal representing said vibration movements such that the second vibration measurement signal contains one or more sinusoidal signal components respectively having a frequency corresponding to a vibration frequency of vibration movements of the first tube, wherein the electronics unit is configured to:
receive and evaluate the first and second vibration measurement signals, including to determine and output measured values representing the at least one measured variable;

provide the drive signal at least intermittently with a sinusoidal first current having a first frequency such that:
the first tube performs first useful vibrations, which are mechanical vibrations forced by the vibration exciter, at a first useful frequency, which is a vibration frequency corresponding to the first frequency of the drive signal; and
the first useful frequency deviates from a resonance frequency of the fundamental vibration mode by less than 1% of said first resonance frequency and/or by less than 1 Hz; and/or
the first useful frequency deviates from a resonance frequency of the second-order vibration mode by more than 5% of said resonance frequency and/or by more than 10 Hz; and/or
the first useful vibrations are suitable for causing Coriolis forces in the flowing measured substance that depend upon the mass flow; and
each of the first and second vibration signals respectively includes a first useful signal component, which is a sinusoidal signal component having a signal frequency corresponding to the first useful frequency;

determine, based upon at least the signal frequency and/or signal amplitude of at least one of the first useful signal components, and/or based upon a phase angle of at least one of the first useful signal components, measured values representing the at least one measured variable, including mass-flow measured values representing the mass flow of the measured substance and/or density measured values representing the density of the measured substance; and provide the drive signal during a test interval that lasts no less than 1 second(s) and/or is time-limited and/or recurrently started, with a sinusoidal second current having a second frequency such that:
the second AC frequency, for two or more vibration periods and/or a period of more than 10 ms (milliseconds), deviates from the resonance frequency of the second-order vibration mode by less than 1% of said resonance frequency and/or by less than 1 Hz;
the first tube performs, simultaneously with the first useful vibrations and/or stationarily for two or more vibration periods and/or a period of more than 10 ms, second useful vibrations having a constant, non-zero vibration amplitude, which are mechanical vibrations forced by the vibration exciter, at a second useful frequency, which is a vibration frequency corresponding to the second frequency, whereby each of the first and second vibration signals respectively includes a second useful signal component, which a sinusoidal signal component having a signal frequency corresponding to the second useful frequency; and
based upon the signal frequency of at least one of the second useful signal components, and/or based upon a signal amplitude of at least one of the second useful signal components, and/or based upon a phase angle of at least one of the second useful signal components, monitor a quality of the measured substance, including to determine whether a fault of the measured substance is present, which is an undesired change of one or more substance parameters of the measured substance.

2. The measuring system according to claim 1, wherein the electronics unit is configured:
for monitoring the quality of the measured substance, based upon both the second useful signal components and the first useful signal components, to determine whether and/or to what extent the fault of the measured substance is present, including as a result of an undesired segregation of the measured substance and/or as a result of an undesired loading of the measured substance by one or more foreign substances; and/or
to determine whether and/or to what extent, due to the fault of the measured substance, a measurement error is present in the determination of the measured values.

3. The measuring system according to claim 1, wherein the first useful frequency deviates from the resonance frequency of the fundamental vibration mode by less than 1% of said resonance frequency and/or by less than 1 Hz.

4. The measuring system according to claim 1, wherein the first useful frequency deviates from a resonance frequency of a third-order vibration mode inherent in the at least one tube, in which third-order vibration mode the vibration movements of the at least one tube include exactly three vibration antinodes and two vibration nodes, by less than 1% of said resonance frequency and/or by less than 1 Hz.

5. The measuring system according to claim 4, wherein a first vibration node of vibration movements of the at least one tube in the third-order vibration mode is disposed in the first tube end, and a second vibration node of the third-order vibration mode is disposed in the second tube end.

6. The measuring system according to claim 5, wherein the harmonic mode corresponds to a second-order vibration mode, in which second-order vibration mode the vibration movements of the at least one tube include exactly two vibration antinodes and three vibration nodes.

7. The measuring system according to claim 6,
wherein a vibration node formed between two vibration antinodes of the vibration movements of the at least one tube in a second-order vibration mode, which is nominally disposed at half the tube length, of said vibration movements is within the reference cross-sectional area; and/or
wherein a main inertia axis, perpendicular to the vibration direction of the vibration movements of the at least one tube in the second-order vibration mode, of the at least one tube is within the reference cross-sectional area of the at least one tube.

8. The measuring system according to claim 1, wherein at least one of:
the drive offset corresponds to a distance between an area centroid of the drive cross-sectional area of the at least one tube and an area centroid of the reference cross-sectional area of the at least one tube;
a line of action of the drive force is perpendicular to a normal of a drive cross-sectional area of the tube;
an intersection line of two, mutually-orthogonal symmetry planes of the at least one tube is within the reference cross-sectional area; and
a main inertia axis, perpendicular to the drive force, of the at least one tube is within the reference cross-sectional area of the at least one tube.

9. The measuring system according to claim 1,
wherein the electronics unit is configured to provide the second current of the drive signal at least intermittently simultaneously with the first current such that an amplitude of the first current is adjusted to not be less than an amplitude of the second current and/or such that an amplitude of the second current is adjusted to more than 40% of an amplitude of the first current; and/or
wherein the electronics unit is configured to adjust the second frequency as a function of the first frequency such that the second frequency is within a frequency setting interval, of which an upper interval limit and/or a lower interval limit and/or a center frequency corresponds to a specified multiple of the first frequency, which is a multiple of the first frequency corresponding to more than 230% of the first frequency and/or less than 300% of the first frequency.

10. The measuring system according to claim 1, wherein the electronics unit includes a digital first phase-locked loop configured to adjust the first frequency, and a digital second phase-locked loop configured used to adjust the second frequency.

11. The measuring system according to claim 10, wherein the electronics unit is configured to adjust a capture range of the second phase-locked loop via at least one output signal of the first phase-locked loop, which is an output signal of a loop filter of the first phase-locked loop, and/or based upon the first frequency.

12. The measuring system according to claim 1, wherein the electronics unit is configured to, at least one of:
determine a modal deflection of the first useful vibrations corresponding to a signal amplitude of one of the first useful signal components, which is a difference of the signal amplitudes of the first useful signal components, including to determine, based upon at least one of the vibration measurement signals, deflection values representing the deflection of the first useful vibrations;
determine a modal deflection of the first useful vibrations corresponding to a signal amplitude of one of the second useful signal components, which is a difference of the signal amplitudes of the second useful signal components, including to determine, based upon at least one of the vibration measurement signals, deflection values representing the deflection of the second useful vibrations; and
determine a deflection ratio corresponding to a ratio of the modal deflection of the first useful vibrations and the modal deflection of the second useful vibrations, including to determine, based upon at least one of the vibration measurement signals, deflection ratio values representing the deflection ratio.

13. The measuring system according to claim 1, wherein the electronics unit is configured to, at least one of:
determine a modal damping of the first useful vibrations corresponding to a ratio of a sum or a difference of the signal amplitudes of the first useful signal components and a signal amplitude of the first current, including to determine, based upon the drive signal and at least one of the vibration measurement signals, damping values representing the damping of the first useful vibrations;
determine a modal damping of the second useful vibrations corresponding to a ratio of a sum or a difference of the signal amplitudes of the second useful signal components, and a signal amplitude of the second current, including to determine, based upon the drive signal and at least one of the vibration measurement signals, damping values representing the damping of the second useful vibrations; and
determine a damping ratio corresponding to a ratio of the modal damping of the first useful vibrations and the modal damping of the second useful vibrations, including to determine, based upon the drive signal and/or at least one of the vibration measurement signals, damping ratio values representing the damping ratio.

14. The measuring system according to claim 1, wherein the electronics unit is configured to determine, based upon the drive signal and at least one of the vibration measurement signals, damping values representing a modal damping of the second useful vibrations, including to compare one or more of the damping values to a damping reference value determined therefor in advance.

15. The measuring system according to claim 14, wherein the electronics unit is configured to, at least one of:
monitor the quality of the measured substance, to compare one or more of the damping values to at least one damping reference value determined therefor in advance or from an intact measuring system, and to output, in the case of a deviation of one or more of the damping values from the damping reference value, a message representing this, the message being a fault alarm;

monitor the quality of the measured substance, to determine, based upon several of the damping values, a temporal change, including a change trend and/or a change rate and/or a change velocity, of the damping of the second useful vibrations, including to determine an increasing fault in the case of decreasing damping of the second useful vibrations and/or to output a message representing an increase in a fault, the message being a fault alarm; and determine, based upon a plurality of damping values, and to output a scatter measure, including an empirical variance and/or a span, for the damping of the second useful vibrations of the at least one tube and/or, for monitoring the quality of the measured substance, to compare the scatter measure to one or more reference values specified therefor.

16. The measuring system according to claim 1, wherein the electronics unit is configured to, at least one of:

determine the resonance frequency of the first vibration mode of the at least one tube by determining, based upon the drive signal and/or at least one of the vibration measurement signals, frequency values representing said resonance frequency;

determine the resonance frequency of the second vibration mode of the at least one tube by determining, based upon the drive signal and/or at least one of the vibration measurement signals, frequency values representing said resonance frequency; and determine a resonance frequency ratio, corresponding to a ratio of the resonance frequency of the first vibration mode of the at least one tube and the resonance frequency of the second vibration mode of the at least one tube, by determining, based upon the first and second frequencies of the drive signal and/or based upon the signal frequencies of the first and second useful signal components of at least one of the vibration measurement signals, frequency ratio values representing the resonance frequency ratio.

17. The measuring system according to claim 1, wherein the electronics unit is configured to determine, based upon the drive signal and/or at least one of the vibration measurement signals, frequency values representing the resonance frequency of the second vibration mode of the at least one tube, including to compare one or more of the frequency values to one or more reference values specified therefor, and/or to use several of the frequency values to determine a scatter measure for the resonance frequency of the second vibration mode of the at least one tube.

18. The measuring system according to claim 17, wherein the electronics unit is configured to determine, based upon a plurality of frequency values, and to output, a scatter measure for the resonance frequency of the second vibration mode of the at least one tube and/or, for monitoring the quality of the measured substance, to compare said scatter measure to a reference value specified therefor and, in the case of a deviation of the scatter measure from the reference value, to output a message representing this.

19. The measuring system according to claim 18, wherein the electronics unit is configured to determine, based upon the drive signal and/or at least one of the vibration measurement signals, frequency ratio values representing a ratio of the resonance frequency of the first vibration mode of the at least one tube and the resonance frequency of the second vibration mode of the at least one tube, including to compare one or more of the frequency ratio values to one or more reference values specified therefor, and/or to use several of the frequency ratio values to determine a scatter measure for the resonance frequency ratio of the at least one tube.

20. The measuring system according to claim 19, wherein the electronics unit is configured:

for monitoring the quality of the measured substance, to compare one or more of the frequency ratio values to at least one frequency ratio reference value determined therefor in advance and to output, in the case of a deviation of one or more of the frequency ratio values from the reference value, a message representing this, wherein the message is a fault alarm; and/or to determine, based upon a plurality of frequency ratio values, and to output a scatter measure, including an empirical variance and/or a span, for the resonance frequency ratio of the at least one tube and/or, for monitoring the quality of the measured substance, to compare said scatter measure to a reference value specified therefor and, in the case of a deviation of the scatter measure from the reference value, to output a message representing this.

21. The measuring system according to claim 1, wherein the electronics unit is configured to determine, based upon the vibration measurement signals, phase difference values representing a phase difference of the second useful signal components, which is a difference between a phase angle of the second useful signal component of the first vibration measurement signal and a phase angle of the second useful signal component of the second vibration measurement signal, and to compare one or more of the phase difference values to a phase difference reference value determined therefor in advance and/or to use several phase difference values to determine a scatter measure for the phase difference of the second useful signal components of the at least one tube.

22. The measuring system according to claim 21, wherein the electronics unit is configured:

for monitoring the quality of the measured substance, to compare one or more of the phase difference values to the phase difference reference value determined therefor in advance, and to output, in the case of a deviation of one or more of the phase difference values from the reference value, a message representing this, wherein the message is a fault alarm; and/or to determine, based upon a plurality of phase difference values, and to output, a scatter measure, including an empirical variance and/or a span, for the phase difference of the second useful signal components and/or, for monitoring the quality of the measured substance, to compare said scatter measure to a reference value specified therefor and, in the case of a deviation of the scatter measure from the reference value, to output a message representing this.

23. The measuring system according to claim 1, wherein the electronics unit is configured to determine, based upon at least one of the vibration measurement signals, deflection ratio values representing a ratio of the deflections of the first useful vibrations and the deflections of the second useful vibrations, including to compare one or more of the deflection ratio values to one or more reference values specified therefor, and/or to use several of the deflection ratio values to determine a scatter measure for the deflection ratio of the at least one tube.

24. The measuring system according to claim 23, wherein the electronics unit is configured:
for monitoring the quality of the measured substance, to compare one or more of the deflection ratio values to at least one deflection ratio reference value determined therefor in advance, and to output, in the case of a deviation of one or more of the deflection ratio values from the reference value, a message representing this, wherein the message is a fault alarm; and/or
to determine, based upon a plurality of deflection ratio values, and to output a scatter measure, including an empirical variance and/or a span, for the deflection ratio of the at least one tube and/or, for monitoring the quality of the measured substance, to compare said scatter measure to a reference value specified therefor and, in the case of a deviation of the scatter measure from the reference value, to output a message representing this.

25. The measuring system according to claim 1, wherein the electronics unit is configured to provide the second current with a specified current amplitude.

26. The measuring system according to claim 25, wherein the electronics unit is configured, for monitoring the quality of the measured substance, to recurrently compare the signal amplitude of at least one of the second useful signal components to an amplitude reference value dependent upon the signal amplitude of the second current and/or specified therefor, wherein the amplitude reference value corresponds to a signal amplitude of the at least one second useful signal component determined at the specified current amplitude of the second current, wherein the recurrently comparing includes determining whether or to what extent the signal amplitude deviates from the amplitude reference value.

27. The measuring system according to claim 1,
wherein the first useful signal components of the first and second vibration measurement signals follow a change in a mass flow of the measured substance conducted in the tube with a change in a phase difference of the first useful signal components, which is a difference between a phase angle of the first useful signal component of the first vibration measurement signal and a phase angle of the first useful signal component of the second vibration measurement signal; and
wherein the electronics unit is configured to generate, based upon the phase difference of the first useful signal components, mass-flow measured values representing the mass flow.

28. The measuring system according to claim 1, wherein the electronics unit is configured to:
follow a change in a density of the measured substance conducted in the at least one tube with a change in the first frequency of the drive signal; and
generate, based upon the first frequency of the drive signal and/or based upon the signal frequency of the first useful signal component of at least one of the vibration signals, density measured values representing the density.

29. The measuring system according to claim 1, wherein the electronics unit is configured, for monitoring the quality of the measured substance, to calculate, based upon the second useful signal components of at least one of the vibration measurement signals, including based upon the signal frequency thereof, and/or based upon a signal amplitude of at least one of the second useful signal components and/or based upon a phase angle of at least one of the second useful signal components, one or more characteristic number values for at least one measured system characteristic number, which characterizes an operating state of the measuring system such that the measuring system characteristic number depends upon one or more parameters of a system function of the measuring system provided between the second useful current component of the drive signal and the second useful signal component of the at least one vibration measurement signal.

30. The measuring system according claim 29, wherein the electronics unit is configured, for monitoring the quality of the measured substance, to respectively compare one or more characteristic number values for the measuring system characteristic number to one or more reference values determined for the measuring system characteristic number, including by the manufacturer of the measuring system and/or during the production and/or a start-up of the measuring system and/or as a function of the drive signal, including one or more reference values representing a reduced functionality of the transducer and/or one or more reference values representing a malfunction of the transducer and/or one or more reference values representing a defective transducer, including to evaluate and/or quantify a deviation of one or more of the characteristic number values from one or more of the reference values.

31. The measuring system according to claim 30, wherein the electronics unit is configured to determine whether one or more characteristic number values for the measuring system characteristic number are greater than the at least one reference value for the measuring system characteristic number, including whether one or more characteristic number values for the measuring system characteristic number are greater than one or more reference values representing a reduced functionality of the transducer and/or greater than one or more reference values representing a malfunction of the transducer and/or greater than one or more reference values representing a no longer intact transducer, to output a message representing this, wherein the message is a fault alarm.

32. The measuring system according to claim 29, wherein the electronics unit includes a non-volatile electronic data memory configured to store digital data, even without an applied operating voltage, including to store one or more reference values determined in advance for the measuring system characteristic number.

33. The measuring system according to claim 32, wherein one or more reference values, determined in advance by the manufacturer of the measuring system and/or during production of the measuring system and/or during operation of the measuring system, for the measuring system characteristic number, including one or more reference values representing a reduced functionality of the transducer and/or one or more reference values representing a malfunction of the transducer, are stored in the electronic data memory.

34. The measuring system according to claim 33, wherein the electronics unit is configured to respectively compare one or more characteristic number values for the measuring system characteristic number to one or more reference values, stored in the data memory, for the measuring system characteristic number.

35. The measuring system according to claim 1, wherein the electronics unit is configured to provide the drive signal with the second current during a test interval, which lasts more than 10 ms and/or is time-limited and/or recurrently started, at a sinusoidal having a second frequency such that the second current is non-volatile or stationary, having a substantially constant, non-zero amplitude for two or more vibration periods and/or a period of more than 10 ms.

36. The measuring system according to claim 35, wherein, at least one of:
the electronics unit is configured to determine during the test interval, based upon the second useful signal components, including, based upon their signal frequency and/or based upon a signal amplitude of at least one of the second useful signal components and/or based upon a phase angle of at least one of the second useful signal component, measured values representing the at least one measured variable;
the test interval lasts for more than 100 ms;
the electronics unit is configured to automatically, in a time-controlled manner, start and/or end the test interval recurrently; and
the electronics unit is configured to receive and execute one or more commands that start the test interval.

37. The measuring system according to claim 1, wherein the tube wall consists of a steel, specifically, a stainless steel, duplex steel or super duplex steel, of a titanium alloy and/or a zirconium alloy, specifically, a Zircaloy, and/or a tantalum alloy.

38. The measuring system according to claim 1, wherein the tube has a caliber more than 0.1 mm.

39. The measuring system according to claim 38, wherein, at least one of:
the tube has a caliber-to-tube-length ratio that is more than 0.08 and/or less than 0.25;
the tube length of the tube is more than 200 mm and/or less than 2,000 mm; and
the tube has a caliber greater than 10 mm.

40. The measuring system according to claim 1, wherein, at least one of:
apart from the vibration exciter, the exciter assembly does not have any further vibration exciter connected to the tube;
the vibration exciter is positioned and aligned such that the drive offset is less than 0.5 mm or such that an area centroid of the drive cross-sectional area of the tube corresponds to or coincides with a drive reference point;
each of the first-order and second-order vibration modes of the tube respectively has a first vibration node located in the first tube end of the at least one tube and a second vibration node located in the second tube end of the at least one tube;
the tube is curved sectionally, including in the shape of a circular arc and/or a V-shape, such that the tube has a central vertex arc segment and/or such that exactly one main inertia axis of the at least one tube is within the reference cross-sectional area of the at least one tube; and
the tube is straight over the entire tube length such that the three main inertia axes of the at least one tube are within the reference cross-sectional area of the at least one tube, and/or a center of mass is within the reference cross-sectional area of the at least one tube.

41. The measuring system according to claim 1, wherein the tube assembly includes at least one second tube, which is at least sectionally curved and/or at least sectionally straight, and/or is structurally identical to the first tube and/or is at least sectionally parallel to the first tube.

42. The measuring system according to claim 41,
wherein the second tube extends with a second tube length from a first second tube end to a second second tube end, and includes a lumen enclosed by a second tube wall and extends from the first tube end to the second tube end, and
wherein the second tube is configured to be traversed by the measured substance at least in the flow direction from the first second tube end to the second second tube end simultaneously with the first tube while able to vibrate.

43. The measuring system according to claim 41, wherein a plurality of vibration modes respectively having an associated resonance frequency is inherent in the second tube, in which modes the second tube can perform or performs vibration movements respectively having one or more vibration antinodes and two or more vibration nodes, such that vibration movements of the second tube in the second-order vibration mode are in opposition to the vibration movements of the first tube in the second-order vibration mode, and/or that vibration movements of the second tube in the first-order vibration move are in opposition to the vibration movements of the first tube in the first-order vibration mode.

44. The measuring system according to claim 43,
wherein a resonance frequency of the first-order vibration mode of the first tube is equal to a resonance frequency of the first-order vibration mode of the second tube, and
wherein a resonance frequency of the second-order vibration mode of the first tube is equal to a resonance frequency of the second-order vibration mode of the second tube.

45. The measuring system according to claim 41, wherein the first vibration sensor is:
positioned on both the first tube and the second tube such that the first vibration sensor is mechanically connected both partially to the first tube and partially to the second tube, and
configured to differentially detect vibration movements, which are vibration movements in opposition of both the first tube and the second tube, and to convert the vibration movements into the first vibration measurement signal such that the vibration measurement signal represents vibration movements in opposition of the first and second tubes.

46. The measuring system according to claim 41, wherein the second vibration sensor is:
positioned on both the first tube and the second tube such that the second vibration sensor is mechanically connected both partially to the first tube and partially to the second tube, and
configured to differentially detect vibration movements, which are vibration movements in opposition of both the first tube and the second tube, and to convert the vibration movements into the second vibration measurement signal such that the vibration measurement signal represents vibration movements in opposition of the first and second tubes.

47. The measuring system according to claim 41, wherein the tube assembly includes:
a first flow divider, which is configured as a line-branching unit and includes at least two flow openings, and
a second flow divider, which is structurally identical to the first flow divider, and/or is configured as a line-merging unit, and includes at least two further flow openings.

48. The measuring system according to claim 47, wherein each of the first and second tubes of the tube assembly is respectively connected to each of the first and second flow dividers as to form fluidically parallel flow channels, such that:

the first tube opens with its first first tube end into a first flow opening of the first flow divider and with its second first tube end into a first flow opening of the second flow divider; and the second tube opens with its first second tube end into a second flow opening of the first flow divider and with its second second tube end into a second flow opening of the second flow divider.

49. The measuring system according claim 41, wherein the vibration exciter is mechanically connected both partially to the first tube and partially to the second tube.

50. The measuring system according claim 41, wherein the vibration exciter is configured to, at least one of:

act differentially on the first and second tubes such that the first and second tubes simultaneously perform opposite forced mechanical vibrations of equal frequency;

convert electrical power with a temporally variable electrical current into mechanical power such that a temporally variable drive force acts on the second tube at a drive point formed by the vibration exciter on the second tube mechanically connected thereto, including simultaneously and/or oppositely to the drive force acting on the first tube at the drive point formed by the vibration exciter on the first tube mechanically connected thereto; and simultaneously convert electrical power fed by the electrical drive signal into forced mechanical vibrations of the first and second tubes such that the first and second tubes simultaneously perform forced mechanical vibrations at the first useful frequency and/or at the second useful frequency.

51. The measuring system according to claim 1, wherein the vibration exciter is formed by a vibration coil including an air coil and an armature; and/or wherein each of the first and second vibration sensors is respectively formed by a plunger coil including an air coil and an armature.

52. The measuring system according to claim 1, wherein the vibration exciter includes a magnetic armature, formed by a permanent magnet, and a coil flooded by the magnetic field of the armature, including an air coil.

53. The measuring system according to claim 52, wherein the magnetic armature is mechanically connected to the at least one tube to form the drive point; and/or wherein the coil is electrically connected to the electronics unit and is configured to receive the drive signal and to conduct the first and second currents thereof.

54. The measuring system according to claim 1, further comprising an electronics protective housing configured for the electronics unit, which electronics protective housing is fastened to a transducer protective housing of the transducer and/or is metallic.

55. The measuring system according to claim 1, further comprising a transducer protective housing, wherein the transducer protective housing and tube assembly are fastened to one another detachably.

* * * * *